(12) United States Patent
Nakayama et al.

(10) Patent No.: US 7,112,625 B2
(45) Date of Patent: Sep. 26, 2006

(54) THERMOCROSSLINKABLE RESIN DISPERSION

(75) Inventors: Hiromitsu Nakayama, Kyoto (JP); Hirofumi Inoue, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 10/509,385

(22) PCT Filed: Mar. 31, 2003

(86) PCT No.: PCT/JP03/04119

§ 371 (c)(1),
(2), (4) Date: May 3, 2005

(87) PCT Pub. No.: WO03/087219

PCT Pub. Date: Oct. 23, 2003

(65) Prior Publication Data

US 2005/0203242 A1   Sep. 15, 2005

(30) Foreign Application Priority Data

Mar. 29, 2002  (JP)  ............................ 2002-097435
Oct. 31, 2002  (JP)  ............................ 2002-317544

(51) Int. Cl.
 C08F 283/02  (2006.01)
 C08F 290/04  (2006.01)
 C08G 18/08   (2006.01)
 C08G 81/02   (2006.01)

(52) U.S. Cl. ...................... 524/504; 524/457; 524/500; 524/502; 524/507; 524/513; 524/514; 428/474.4; 428/480; 428/500

(58) Field of Classification Search ............. 428/474.4, 428/480, 500; 524/457, 502, 507, 513, 514, 524/500, 504
See application file for complete search history.

(56) References Cited

U.S. PATENT DOCUMENTS

| 5,767,188 A  | 6/1998 | Kamikuri et al. |
| 6,277,912 B1 | 8/2001 | Ashihara et al. |
| 6,344,500 B1 | 2/2002 | Ogawa et al. |

FOREIGN PATENT DOCUMENTS

| EP | 0 874 031 A1 | 10/1998 |
| EP | 874031       | 10/1998 |
| JP | 6-336568     | 12/1994 |
| JP | 11-29673     | 2/1999  |
| JP | 2001-139875  | 5/2001  |

*Primary Examiner*—Kriellion Sanders
(74) *Attorney, Agent, or Firm*—Westerman, Hattori, Daniels & Adrian, LLP.

(57) ABSTRACT

An aqueous resin dispersion useful as a primer capable of providing plastics products, in particular polyolefin plastics products, with good coatability characteristics. A thermocrosslinkable resin dispersion having a continuous phase having an aqueous medium and a dispersed phase distributed therein, the dispersed phase having particles (I) of a resin component and particles (II) of a crosslinking agent as separately dispersed from the particles (I), the resin component having, as an essential constituent thereof, a modified polyolefin resin (a) or a mixture thereof with a vinyl resin (b), the resin (a) having a number average molecular weight of at least 1,500 and having at least one functional group species selected from the group of carboxyl, hydroxyl, mercapto, amino, isocyanate and carbodiimide groups, the resin (b) having a number average molecular weight of 700 to 40,000 and a glass transition temperature of −65 to 40° C., and the crosslinking agent having at least two groups reactive with the resin (a).

26 Claims, No Drawings ed
THERMOCROSSLINKABLE RESIN DISPERSION

TECHNICAL FIELD

The present invention relates to a thermocrosslinkable resin dispersion. More particularly, it relates to an aqueous thermocrosslinkable resin dispersion useful as a primer for plastics products, in particular polyolefin plastics products.

BACKGROUND ART

As primers for improving the coatability characteristics (film-forming properties, adhesion, etc.) to polyolefin plastics products such as automobile interior and exterior members, there are known in the art fully aqueous primers combining a carboxy-modified polyolefin resin, a hydroxy-modified polyolefin resin and a polystyrene-poly-conjugated diene-polystyrene triblock copolymer (cf. e.g. Japanese Kokai Publication Hei-11-29673), and primers capable of being rendered completely aqueous combining an aqueous dispersion of a polyolefin resin, an aqueous dispersion of an acrylic resin and an aqueous dispersion of a urethane resin (cf. e.g. Japanese Kokai Publication Hei-06-336568).

SUMMARY OF THE INVENTION

It is an object of the present invention to provide an aqueous resin dispersion useful as a primer capable of providing plastics products, in particular polyolefin plastics products, with good coatability characteristics.

Another object of the invention is to provide an aqueous thermocrosslinkable resin dispersion capable of giving coat films excellent in gasohol resistance (gasoline resistance and alcohol resistance) and water resistance.

A further object of the invention is to provide an aqueous resin dispersion showing good film-forming properties even at low temperatures.

A still another object of the invention is to provide an aqueous resin dispersion capable of manifesting a sufficient level of adhesion even upon low-temperature baking.

A still further object of the invention is to provide a method of coating polyolefin plastics products having no possibility of environmental contamination.

A still further object of the invention is to provide a coated polyolefin plastics product useful as an automobile interior or exterior member.

Briefly, these objects and other objects, which will become apparent later herein, of the present invention could be accomplished by providing, generally, a thermocrosslinkable resin dispersion, which comprises a continuous phase comprising an aqueous medium and a dispersed phase distributed therein, said dispersed phase comprising particles (I) of a resin component and particles (II) of a crosslinking agent (c) as separately dispersed from the particles (I), and said resin component comprising, as an essential constituent thereof, a modified polyolefin resin (a) or a mixture thereof with a vinyl resin (b). The resin (a) has a number average molecular weight (hereinafter abbreviated as "Mn") of at least 1,500 and at least one functional group species. The resin (b) has an Mn of 700 to 40,000 and a glass transition temperature (hereinafter abbreviated as "Tg") of −65 to 40° C. The crosslinking agent (c) has at least two functional groups reactive with the resin (a).

DETAILED DESCRIPTION OF THE INVENTION

[Modified Polyolefin Resin (a)]

Examples of the functional group of the resin (a) include one or two or more functional group species selected from the group consisting of carboxyl, hydroxyl, mercapto, amino, isocyanate and carbodiimide groups. Examples of the "carboxyl group" so referred to herein include, within the meaning thereof, a carboxylic acid group and a carboxylic acid anhydride group; and the "amino and isocyanate groups" respectively include free (unblocked) amino and isocyanate groups as well as blocked (protective group-masked) amino and isocyanate groups.

The resin (a) is a modification of a polyolefin resin (a0). Examples of the resin (a0) to be modified include homopolymers of an olefin and copolymers of two or more olefins as well as copolymers of one or more olefins and one or more other monomers (the olefin content being generally at least 30%, preferably at least 50%, in particular at least 70%). In the above and subsequent description, "%" and "ratio" mean "% by weight" and "weight ratio", respectively, unless otherwise specified.

Examples of the olefin include C2–30 (preferably C2–12, in particular C2–3) alkenes (C denoting the number of carbon atoms), for example ethylene, propylene, 1-, 2- and iso-butene as well as C5–30 α-olefins (1-hexene, 4-methylpentene-1,1-decene, 1-dodecene, etc.); and examples of the other monomer include unsaturated monomers copolymerizable with olefins, for example styrene, vinyl acetate, (meth)acrylic acid (denoting acrylic acid and/or methacrylic acid; similar expressions are used hereinafter) and alkyl (C1–30) esters thereof.

Specific examples of the resin (a0) include ethylene-based polymers such as high-density, medium-density and low-density polyethylene species and copolymers of ethylene and a C4–30 unsaturated monomer [butene (1-butene etc.), a C5–30 α-olefin (1-hexene, 1-dodecene, etc.), vinyl acetate, (meth)acrylic acid, etc.] (copolymerization ratio: 30/70 to 99/1, preferably 50/50 to 95/5); propylene-based polymers such as polypropylene, copolymers of propylene and a C4–30 unsaturated monomer (same as above) (copolymerization ratio: same as above); ethylene/propylene copolymers (copolymerization ratio: 0.5/95.5 to 30/70, preferably 2/98 to 20/80); polymers of a C4 or higher olefin, for example polybutene and poly-4-methylpentene-1. Among these, polypropylene, ethylene/propylene copolymers and, in particular, propylene/α-olefin (C4–20) copolymers are preferred from the viewpoint of melt viscosity and adhesion to polyolefin plastics products.

The resin (a0) generally has a Mn of 1,500 to 40,000, preferably 2,000 to 30,000, more preferably 2,500 to 25,000, in particular 3,000 to 6,000 [as determined by gel permeation chromatography (GPC); hereinafter the same shall apply]. When the Mn is below 1,500, the coat films formed from the aqueous resin dispersion will be poor in gasohol resistance. Resins having a Mn exceeding 40,000 are low in reactivity with a modifying agent [unsaturated dicarboxylic acid (anhydride)] and are not desirable from the viewpoint of the adhesion between the coat film formed from the aqueous resin dispersion and the topcoat film.

From the viewpoint of the reactivity with the modifier, the resin (a0) preferably contains at least 0.1, more preferably at least 0.3, most preferably at least 0.5 double bond per 1,000 carbon atoms. The upper limit to the double bond content per 1,000 carbon atoms is not particularly restricted but may be 20 or more. From the ease of production viewpoint, however, it is preferably not more than 15, more preferably not more than 6, most preferably not more than 5.5.

Examples of the resin (a0) include polyolefins as polymerized and degraded polyolefins [products of mechanical, thermal or chemical degradation of high-molecular-weight polyolefins (preferably having a Mn of 50,000 to 150,000)]. Preferred from the viewpoint of ease of modification, film-forming properties of the aqueous resin dispersion and/or the adhesion between the coat film formed and the topcoat film are degraded polyolefins, in particular thermally degraded polyolefins. The thermally degraded polyolefins are not particularly restricted but there may be mentioned those thermally degraded ones derived from high-molecular-weight polyolefins by heating in an inert gas (generally at 300 to 450° C. for 0.5 to 10 hours) (e.g. those described in Japanese Kokai Publication Hei-03-62804).

Examples of the resin (a) include carboxy-modified polyolefin resins (a1) [resins (a11) derived from (a0) by carboxy modification, and resins (a12) derived from (a11) by further carboxy modification (secondary modification) with a carboxy modifying agent (m12)] and highly modified polyolefin resins (a2) derived from the resins (a1) by further modification (secondary, tertiary or higher-order modification) with one or more other modifying agents (m2) for introduction of one or more of the above-mentioned functional groups other than the carboxyl function, and mixtures of two or more of these.

Examples of the resin (a11) include i) modifications of (a0) as resulting from reaction with an α,β-unsaturated carboxylic acid (anhydride) (m11) and ii) modifications of (a0) as resulting from oxidation with an oxidizing agent (e.g. oxygen and/or ozone) for carboxyl group introduction.

Examples of (m11) include unsaturated monocarboxylic acids, unsaturated dicarboxylic acids, and anhydrides thereof. The monocarboxylic acids include C3–18 (preferably C3–15, in particular C3–10) aliphatic, alicyclic and aromatic ring-containing monocarboxylic acids, for example (meth)acrylic, (iso)crotonic, cyclohexenemonocarboxylic and cinnamic acid; and the dicarboxylic acids (anhydrides) include aliphatic ones (C4–18, preferably C4–15, in particular C4–12), for example maleic acid (anhydride), fumaric acid, itaconic acid (anhydride), citraconic acid (anhydride), mesaconic acid and allylmalonic acid; alicyclic ones (C7–24, preferably C8–16), for example 4-cyclohexene-1,2-dicarboxylic acid; and aromatic ring-containing ones (C8–24, preferably C8–16), for example phenylmaleic acid. Preferred from the viewpoint of the compatibility and reactivity with (a0) and of the melt viscosity of the resulting (a1) are unsaturated dicarboxylic acid (in particular aliphatic dicarboxylic acid) anhydrides. In particular, maleic anhydride (hereinafter abbreviated as "MA").

The amount of (m11) to be used for modification is generally 0.5 to 40%, preferably 1 to 30% based on the weight of (a0).

Although the modification method and conditions are not particularly restricted, an acid (anhydride) can be thermally added to the terminal double bond of (a0) (ene reaction) by the solution technique or fusion technique. For example, there may be mentioned (1) the method comprising mixing (m11) with (a0) in fused state and then heating the mixture, if necessary in the presence of an organic peroxide; (2) the method comprising mixing (a0), (m11) and a solvent together and then heating the mixture, if necessary in the presence of an organic peroxide; and (3) the method comprising adding an organic peroxide to (a0) and (m11) during kneading thereof with heating in a twin-screw extruder. Examples of the organic peroxide include dicumyl peroxide, di-tert-butyl peroxide and the like. The amount thereof is generally 0.1 to 10%, preferably 0.5 to 5%, based on the total amount of (a0) and (m11). The reaction temperature can be varied within a wide range (e.g. 80 to 230° C.) but should be adequately selected depending on the method employed. In the case of method (1), it is generally 100 to 220° C., preferably 140 to 200° C.; in the case of method (2), it is generally 80 to 180° C., preferably 110 to 150° C.; and in the case of method (3), it is generally 80 to 140° C. Examples of the solvent to be used in method (2) include toluene, xylene, etc. Among these methods, the method (2) is preferred from the viewpoint of the possibility of the reaction being carried out uniformly with a low level of byproduct formation.

The carboxyl group introduction by oxidation can be carried out by the method described in U.S. Pat. No. 3,692,877, for instance.

The resins (a1) and (a2) may have a polymer moiety in addition to the carboxyl group and/or functional group(s) mentioned above. The polymer moiety-constituting polymer generally has a Mn of 300 to 25,000, preferably 1,000 to 20,000, more preferably 2,500 to 10,000. A Mn in the range of 800 to 25,000 is preferred from the heat resistance viewpoint.

Examples of the above-mentioned polymer include polyethers, polyesters, polyamides and polyurethanes (hereinafter abbreviated as "PTs", "PSs", "PDs" and "PUs", respectively), and combinations of two or more of these. Among these polymers, hydrophilic polymers having an HLB of at least 6, in particular 10 to 250, are preferred. The term "HLB" as used herein is the HLB value determined by the method of Oda [calculated value based on the inorganicity/organicity ratio in the conceptual diagram of the organic compound] [cf. e.g. "New Introduction to Surfactants" (published 1981 by Sanyo Chemical Industries; English Edition published 1985), page 197]. Resins having such a hydrophilic polymer moiety are self-emulsifiable.

The polymer moiety can be introduced by the following method 1) and/or 2).

1) The method which comprises using, as at least part of the modifier (m12) or (m2), a polymer (PT, PS, PD, PU or a combination of two or more of these) having said functional group (selected from the group consisting of carboxyl, hydroxyl, mercapto, amino, isocyanate and carbodiimide groups) or a precursor(s) of that polymer for forming a resin modified by that polymer or for forming the polymer moiety by a polymerization reaction (e.g. ring-opening polymerization, polycondensation or polyaddition reaction) of that precursor(s); and
2) The method which comprises using a modifying agent (m3) for polymer moiety introduction which is other than (m12) and (m2) for polymer modification of part of the carboxyl group of (a1), or using (m3) in combination with (m12) and/or (m2) for introducing a polymer moiety in addition to the corresponding functional group.

Examples of the modifier (m12) to be used for producing the resin (a12) include (m121) an aminocarboxylic acid and a hydroxycarboxylic acid, (m120) precursors thereof (compounds capable of forming the compounds mentioned above; hereinafter the same shall apply), namely a lactam and a lactone, (m122) combinations of a carboxy-reactive coupling agent and a polycarboxylic acid (indicating such an acid or an ester-forming reactive derivative thereof; hereinafter the same shall apply), and combinations of two or more species of these. The secondary modification of (a11) can be realized by (poly)condensation of (m121), by ring-opening addition (polymerization) of (m120), or by the coupling reaction of (m122).

Examples of the lactam include C4–15 (preferably C6–12) ones, for example caprolactam, enantholactam, laurolactam and undecanolactam; examples of the aminocarboxylic acid include C2–12 ones, for example amino acids [glycine, alanine, valine, (iso)leucine, phenylalanine, etc.], ω-aminoalkanoic acids [e.g. ω-aminocaproic, ω-aminoenanthic, ω-aminocaprylic, ω-aminopelargonic, ω-aminocapric, 11-aminoundecanoic and 12-aminododecanoic acid], and aromatic aminocarboxylic acids (e.g. o-, m- and p-aminobenzoic acid); the lactone and hydroxycarboxylic acid include those corresponding to the above-mentioned lactams and aminocarboxylic acids (resulting from substitution of O for NH) (e.g. ε-caprolactone, γ-butyrolactone, γ-valerolactone, ω-hydroxycaproic acid, salicylic acid, p- and m-hydroxybenzoic acid), and glycolic acid, glyceric acid, tartronic acid, malic acid, tartaric acid and benzilic acid. Preferred are caprolactam and 12-aminododecanoic acid. The amount of the modifier (m12) or (m120) is 1 to 10 moles or more, preferably 1 mole, per unsaturated dicarboxylic acid (anhydride) group or per carboxyl group in (a1).

Examples of the carboxy-reactive coupling agent include compounds having two or more carboxy-reactive groups, for example polyamines (hereinafter abbreviated as "PAs"), polyols, organic polyisocyanates (hereinafter abbreviated as "PIs"), polyepoxides and epoxyalcohols. These PAs, polyols, PIs, polyepoxides and polycarboxylic acids include those mentioned later herein, and the lactams and lactones include those mentioned above, and the epoxyalcohols include glycidol and the like.

The degree of carboxy modification of the resin (a1) is not particularly restricted. From the viewpoint of the adhesion between the coat film formed from the aqueous resin dispersion and the plastic substrate and of the gasohol resistance of the coat film after crosslinking, however, (a1) preferably has an acid value of 5 to 100 (mg KOH/g; hereinafter the same shall apply), more preferably 10 to 80, most preferably 20 to 60.

The resin (a12) comprises a structure resulting from conversion of at least part of the carboxyl groups (carboxylic acid groups or carboxylic acid anhydride groups; hereinafter the same shall apply) of (a11) to carboxy-containing groups represented, for example, by the following general formulas:

—Z—(X-L-Z)$_n$—X-L-Z—OH, (—Z—)$_p$X-L$^3$[—X—(Z-L$^1$-Z—X-L$^2$-X)$_n$—Z-L$^1$-Z—OH]$_f$, (—Z—)$_p$X-L$^3$[—X—Z—(L-X—Z)$_n$-L$^1$-(Z—X-L)$_n$—Z—OH]$_f$,

In the above formulas, Z represents —CO— (carbonyl group); n represents an integer of 0 or 1 or greater (1 to 9 or greater); L represents the residue of an aminocarboxylic acid or hydroxycarboxylic acid (as resulting from removal of the amino or hydroxyl group and the carboxyl group) or the residue of a lactam or lactone (as resulting from removal of the amide or ester bond); L$^1$ represents the residue of a polycarboxylic acid (as resulting from removal of two carboxyl groups); L$^2$ represents the residue of a diamine or diol (as resulting from removal of the amino or hydroxyl groups); f represents an integer of 0 or 1 or greater; L$^3$ represents the residue of a PA, polyol or PI whose valence is (1+f) (as resulting from removal of the amino, hydroxyl or isocyanate groups) or the group resulting from epoxy ring opening (the group formed upon ring opening of an epoxide); p represents 1 or 2; and X represents —O— (when L is the residue of a hydroxycarboxylic acid or lactone, L$^2$ is the residue of a diol and/or L$^3$ is the residue of a polyol or the group resulting from ring opening of an epoxide) or —NH— (when L is the residue of an aminocarboxylic acid or lactam, L$^2$ is the residue of a diamine and/or L$^3$ is the residue of a PA or PI) [X bound to (—Z—)$_p$ being >N— when L$^3$ is the residue of a PA and p is 2] [namely, (—Z—)$_p$X— being an ester bond, amide bond or imide bond]. In the preceding and succeeding descriptions, when one and the same symbol appears two or more times, the two or more groups/atoms represented thereby may be the same or different.

Examples of the group resulting from epoxy ring opening include —CH$_2$—CH(OH)—CH$_2$— and groups resulting from polyepoxy ring opening, for example groups of the formula—CR$^1$—CR$^2$-E-(CR$^2$—CR$^1$—)$_f$ [in which E is the residue of a polyepoxide (as resulting from removal of the epoxy group); one of R$^1$ and R$^2$ (e.g. R$^2$) is OH and the other (e.g. R$^1$) is H or both of them (e.g. two R$^1$s) may be bound to each other or to E to form a ring (when E is the residue of an alicyclic polyepoxide)].

Preferred as the resin (a1) is (a11), in particular an unsaturated dicarboxylic acid (anhydride)-modified polyolefin.

The resin (a2) is one derived from (a1) by further modification(s) (secondary, tertiary or higher-order modification) by reacting with one or more modifying agents (m2) for the introduction of at least one functional group species selected from the group consisting of hydroxyl, mercapto, amino, isocyanato and carbodiimido groups; according to the functional group species introduced, there to be mentioned OH-modified polyolefin resins (a21), SH-modified polyolefin resins (a22), amino-modified polyoletin resins (a23), NCO-modified polyolefin resins (a24) and carbodiimido (hereinafter abbreviated as "CD")-modified polyolefin resins (a25).

Examples of the modifying agent (m2) to be used for the above functional group introduction include polyfunctional compounds having the functional group to be introduced and a carboxy-reactive group, precursors thereof, combinations of a carboxy-reactive group-containing coupling agent and a polyfunctional compound having a group reactive with the coupling agent and the functional group to be introduced, and combinations of two or more of these. Examples of the carboxy-reactive group include hydroxyl, mercapto, amino, isocyanate and carbodiimide groups. These may be the same as or different from the functional group to be introduced. The polyfunctional compound mentioned above may be such a polymer as mentioned above (polyfunctional polymer) or one having a low molecular weight, or may comprise a combination of both. Polymer moiety introduction can also be realized by using a low-molecular-weight polyfunctional compound and a monofunctional polymer (having one carboxy-reactive group or one group reactive with the coupling agent) in combination.

The resins (a21), (a22), (a23) and (a24) can be produced by secondary or tertiary modification of (a1) by reacting (directly or through a coupling agent) with a OH-modifying agent (m21), SH-modifying agent (m22), amino-modifying agent (m23) and NCO-modifying agent (m24), respectively. (a25) can be produced by CD modification of (a24).

Examples of the OH-modifying agent (m21) include (m211) polyfunctional compounds having a carboxy-reactive group(s) and a hydroxyl group(s) (hydroxylamines, polyols, etc.), (m210) epoxides precursors thereof, (m212) combinations of a carboxy-reactive coupling agent and a polyfunctional compound having a group(s) reactive with the coupling agent and a hydroxyl groups(s) (hydroxylamines, polyols, hydroxycarboxylic acids, etc.), and combinations of two or more of these.

The hydroxylamines include C2–10 (di)alkanolamines, cycloalkanolamines and alkylalkanolamines, for example 2-aminoethanol, 3-aminopropanol, 1-amino-2-propanol, 4-aminobutanol, 5-aminopentanol, 6-aminohexanol, diethanolamine, di-n- and iso-propanolamine, 3-aminomethyl-3,5,5-trimethylcyclohexanol, methylethanolamine and ethylethanolamine. Preferred among others is 2-aminoethanol.

The modification with a hydroxylamine can be made by directly reacting (a1) with the hydroxylamine. The reaction temperature is generally 120 to 230° C. The equivalent ratio between amino group of the hydroxylamine to be used for modification and the carboxylic acid (anhydride) group of (a1) is generally 0.1 to 2, preferably 0.3 to 1.5, more preferably 0.5 to 1.2, most preferably 1.

Examples of the epoxide include monoepoxides, such as alkylene oxides (hereinafter abbreviated as "AOs"), glycidyl ethers (hereinafter, "GEs") [alkyl (C1–12 or higher) GEs, e.g. butyl GE], glycidyl esters (hereinafter, "GSs") [monocarboxylic acid (C1–12 or higher aliphatic, alicyclic, and aromatic monocarboxylic acid) GEs] and epoxy alcohols (glycidol etc.); and polyepoxides (to be described later herein).

Examples of the AO include C2–12 or higher (preferably C2–4) AOs, for example ethylene oxide, 1,2-propylene oxide, 1,2-, 2,3- and 1,3-butylene oxide, tetrahydrofuran and 3-methyltetrahydrofuran (hereinafter abbreviated as "EO", "PO", "BO", "THF" and "MTHF", respectively), 1,3-propylene oxide, iso-BO, C5–12 α-olefin oxides, substitutes AOs, for example styrene oxide and epihalohydrins (epichlorohydrin etc.), and combinations of two or more of these (random addition(s) and/or block addition(s)).

Examples of the hydroxycarboxylic acid include those species mentioned hereinabove.

Examples of the polyol include dihydric to octahydric or further hydric high-molecular-weight polyols (having a OH equivalent of 250 or higher), low-molecular-weight polyols (having a OH equivalent of lower than 250), and mixtures of two or more these.

The low-molecular-weight polyols include polyhydric alcohols and low-molecular-weight OH-terminated polymers (PT polyols and PS polyols).

The polyhydric alcohols include the following.

Dihydric alcohols (C2–20 or higher), for example C2–12 aliphatic divalent alcohols [(di)alkylene glycols, e.g. ethylene glycol, diethylene glycol, propylene glycol, dipropylene glycol, 1,2-, 2,3-, 1,3- and 1,4-butanediol, 1,6-hexanediol, neopentyl glycol and 3-methylpentanediol (hereinafter abbreviated as "EG", "DEG", "PG", "DPG", "BD", "HD", "NPG" and "MPD", respectively), dodecanediol, etc.]; C6–10 alicyclic dihydric alcohols [1,4-dyclohexanediol, cyclohexanedimethanol, etc.]; C8–20 aromatic dihydric alcohols [xylylene glycol, bis(hydroxyethyl)benzene, etc.];

Trihydric to octahydric or further polyhydric alcohols, for example (cyclo)alkanepolyols and intramolecular or intermolecular dehydration products derived therefrom [glycerol, trimethylolpropane, pentaerythritol, sorbitol and dipentaerythritol (hereinafter abbreviated as "GR", "TMP", "PE", "SO" and "DPE", respectively), 1,2,6-hexanetriol, erythritol, cyclohexanetriol, mannitol, xylitol, sorbitan, diglycerol, other polyglycerols, etc.], sugars and derivatives thereof [e.g. sucrose, glucose, fructose, mannose, lactose, and glycosides (methylglucoside etc.)];

Nitrogen-containing polyols (tertiary amino group-containing polyols and quaternary ammonium group-containing polyols): nitrogen-containing diols, for example bishydroxyalkyl (C2–4) derivatives of C1–12 aliphatic, alicyclic and aromatic primary monoamines (methylamine, ethylamine, 1- and 2-propylamine, (iso)amylamine, hexylamine, 1,3-dimethylbutylamine, 3,3-dimethylbutylamine, 1-, 2- and 3-aminoheptane, nonylamine, decylamine, undecylamine, dodecylamine, cyclopropylamine, cyclopentylamine, cyclohexylamine, aniline, benzylamine, etc.) [bis(2-hydroxyethyl) derivatives, bis(hydroxypropyl) derivatives, etc., e.g. tertiary nitrogen atom-containing polyols described in U.S. Pat. No. 4,271,217], and quaternization products derived therefrom [products of quaternization with those quaternizing agents or dialkyl carbonates (to be described later herein) described in the above-cited U.S. patent specification], for example, quaternary nitrogen atom-containing polyols described in the above-cited U.S. patent specification; and trihydric to octahydric or further polyhydric nitrogen-containing polyols, for example trialkalnol(C2–4) amines (triethanolamine etc.) and polyhydoxyalkyl(C2–4). derivatives of C2–12 aliphatic, alicyclic, aromatic and heterocyclic PAs [those species described later herein, for example ethylenediamine, tolylenediamine, aminoethylpiperazine] [poly(2-hydroxyethyl) derivatives, bis(hydroxypropyl) derivatives, etc.: e.g. tetrakis(2-hydroxypropyl)ethylenediamine and pentakis(2-hydroxypropyl)diethylenetriamine], and quaternization products similar to those described hereinabove;

Sulfo group-containing polyols: products derived from the above-mentioned dihydric or trihydric to octahydric or further polyhydric alcohols by sulfo group introduction, for example sulfoglycerol, sulfoerythritol, sulfodi(hydroxymethyl)benzene, sulfodi(hydroxyethyl)benzene, sulfodi(hydroxypropyl)benzene, sulfohydroxymethylhydroxyethylbenzene, and salts thereof (same salts as those mentioned later herein referring to anionic surfactants).

The low-molecular-weight OH-terminated polymers include such PT polyols, PS polyols and PU polyols having a OH equivalent of less than 250 as mentioned later herein. For example, there may be mentioned low-molar AO adducts of low-polymerization-degree AO ring opening polymers and active hydrogen-containing polyfunctional compounds [e.g. PEG, PPG, PTMG, etc., and such EO (2 to 4 moles) adducts of bis(hydroxyethoxy)benzene and bisphenol A as mentioned later herein), low-molar lactone adducts derived from low-condensation-degree PS polyols and polyols [e.g. caprolactone (1 mole) adducts of condensation products from a polycarboxylic acid and an excess (1 mole per carboxyl group) of a polyhydric alcohol (e.g. dihydoxyethyl adipate), and of EG], and low-polymerization-degree PU polyols [reaction products from a PI and an excess (1 mole per isocyanate group) of a polyhydric alcohol (e.g. reaction products from 1 mole of TDI and 2 moles of EG)].

The high-molecular-weight polyol generally has a OH equivalent (molecular weight per OH as calculated based on the OH value) of 250 to 3,000 or greater. The polyol generally has a Mn of 500 to 5,000 or higher, preferably 700 to 4,500. It preferably has a weight average molecular weight (as measured by GPC; hereinafter abbreviated as "Mw") of 500 to 6,000, more preferably 700 to 4,000. Examples thereof include OH-terminated polymers [PTs, PSs, PDs, PUs, vinyl polymers (hereinafter, "VPs") and polymer polyols (hereinafter abbreviated as, "P/P")], and mixtures of two or more of these.

The OH-terminated PTs include polymers resulting from ring opening polymerization of an AO, PT polyols having a structure resulting from addition of one or more AOs to an initiator having at least two (2 to 8 or more) active hydrogen atoms (AO adducts), and PT polyols resulting from coupling of two or more (same or different) molecules thereof by means of a coupling agent.

Examples of the initiator for AO addition include, for example, the above-enumerated polyhydric alcohols, hydroxylamines, aminocarboxylic acids and hydroxycarboxylic acids; polyhydric phenols; and polycarboxylic acids (to be mentioned later herein).

The polyhydric phenols include C6–18 dihydric phenols, for example monocyclic dihydric phenols (hydroquinone, catechol, resorcinol, urushiol, etc.), bisphenols (bisphenol A, F, C, B, AD and S, dihydroxybiphenyl, 4,4'-dihydroxydiphenyl-2,2-butane, etc.), and condensed polycyclic dihydric phenols [dihydroxynaphthalene (e.g. 1,5-dihydoxynaphthalene), binaphthol, etc.]; as well as trihydric to octahydric or further polyhydric phenols, for example a monocyclic polyhydric phenol (e.g. pyrogallol, phloroglucinol) and low condensation products from a mono- or dihydric phenol (e.g. phenol, cresol, xylenol, resorcinol) and an aldehyde or ketone (e.g. formaldehyde, glutaraldehyde, glyoxal, acetone) (e.g. phenol or cresol novolak resins, resol intermediates, polyphenols obtained by condensation of phenol and glyoxal or glutaraldehyde, and polyphenols obtained by condensation of resorcinol and acetone). Preferred among these are aliphatic dihydric alcohols and bisphenols, in particular ethylene glycol and bisphenol A.

The addition of the AO to the initiator can be carried out in the conventional manner. Thus, it is carried out in one step or two or more steps in the absence or presence of a catalyst (e.g. alkali catalyst, amine type catalyst, acidic catalyst) (in particular at the later stage of AO addition) at ordinary pressure or under pressure. The addition of two or more AOs may be carried out in the manner of random addition or block addition or a combination of both (e.g. random addition followed by block addition).

Examples of the coupling agent for coupling AO adducts include polyhalides, for example C1–6 alkane polyhalides (e.g. C1–4 alkylene dihalides: methylene dichloride, 1,2-dibromoethane, etc.); epihalohydrins (epichlorohydrin etc.); and polyepoxides (to be mentioned later herein).

Examples of the OH-terminated PTs include PT diols, for example polyalkylene glycols (hereinafter abbreviated as "PAGs") [e.g. polyethylene glycol, polypropylene glycol and polytetramethylene ether glycol (hereinafter abbreviates as "PEG", "PPG" and "PTMG", respectively), poly-3-methyltetramethylene ether glycol], copolymeric polyoxyalkylene diols [EO/PO copolymer diols, THF/EO copolymer diols, THF/MTHF copolymer diols, etc. (weight ratio: 1/9 to 9/1, for instance), aromatic ring-containing polyoxyalkylene diols [polyoxyalkylene bisphenol A (e.g. EO and/or PO adduct of bisphenol A)]; and trifunctional or further polyfunctional PT polyols, for example polyoxypropylene triols (e.g. PO adducts of GR); as well as products of coupling of one or more of these using methylene dichloride.

The OH-terminated PSs include condensed PS polyols, polylactone (hereinafter, "PL") polyols, castor oil-based polyols [castor oil (ricinolic acid triglyceride) and polyol modifications thereof], and polycarbonate polyols.

The condensed PS polyols can be produced by polycondensation of a polyol and a polycarboxylic acid (if necessary together with a hydroxycarboxylic acid) or reaction of a polyol with a polycarboxylic acid anhydride and an AO; the PL polyols by ring opening addition of a lactone with a polyol as an initiator (or polycondensation of a polyol and a hydroxycarboxylic acid); the polyol modifications of castor oil by transesterification between castor oil and a polyol; and the polycarbonate polyols by ring opening addition/polycondensation of an alkylene carbonate using a polyol as an initiator, polycondensation (transesterification) of a polyol with diphenyl or dialkyl carbonate, or reaction of a polyol or a dihydric phenol (any of those enumerated above: e.g. bisphenol A) with phosgene.

The polyol to be used for the production of PSs generally has a OH equivalent (Mn per OH) of not higher than 1,000, preferably 30 to 500. Examples include the above-mentioned polyhydric alcohols [diols (e.g. EG, 1,4-BD, NPG, HD and DEG) and trihydric or further polyhydric polyols (GR, TMP, PE, etc.)], the above-mentioned PT polyols (PEG, PPG, PTMG, etc.), and mixtures of two or more of these. Preferred in the production of condensed PS polyols are diols and combinations of a diol and a small proportion (e.g. not larger than 10 equivalent percent) of a trihydric or further polyhydric polyol.

Examples of the polycarboxylic acid include dicarboxylic acids and tribasic or tetrabasic or further polybasic polycarboxylic acids. Examples thereof include C2–30 or higher (preferably C2–12) saturated or unsaturated aliphatic polycarboxylic acids, for example C2–15 dicarboxylic acids (e.g. oxalic, succinic, malonic, adipic, suberic, azelaic, sebacic, dodecanedicarboxylic, maleic, fumaric and itaconic acid), C6–20 tricarboxylic acids (e.g. tricarballylic and hexanetricarboxylic acid)]; C8–15 aromatic polycarboxylic acids, for example dicarboxylic acids (e.g. terephthalic, isophthalic and phthalic acid), tri- and tetracarboxylic acids (e.g. trimellitic and pyromellitic acid); C6–40 alicyclic polycarboxylic acids (dimer acid etc.); and sulfo group-containing polycarboxylic acids (derivatives of the above-mentioned polycarboxylic acids as resulting from sulfo group introduction, e.g. sulfosuccinic, sulfomalonic, sulfoglutaric, sulfoadipic and sulfoisophthalic acid, and salts thereof (same salts as those mentioned later herein referring to anionic surfactants)]; as well as carboxy-terminated polymers.

The carboxy-terminated polymers include PT polycarboxylic acids, for example carboxymethyl ethers of polyols [the above-mentioned polyhydric alcohols, PT polyols, etc.] (as obtained by reacting with monochloroacetic acid in the presence of an alkali); and PD, PS and/or PU polycarboxylic acids, for example polylactam-polycarboxylic acids and PL polycarboxylic acids obtained by ring opening polymerization of a lactam or lactone (mentioned above) with such a polycarboxylic acid as mentioned above, for instance, as an initiator, condensed PS polycarboxylic acids and condensed PD polycarboxylic acids resulting from coupling (esterification or amidation) of two or more molecules of any of the polycarboxylic acids mentioned above with a polyol (as mentioned above) or a PA or PI (to be mentioned later herein), and PU polycarboxylic acids obtained by reacting (in the manner of urethane formation and esterification or amidation) such a polycarboxylic acid and polyol as mentioned above with a PI.

Examples of the ester-forming reactive derivative include acid anhydrides, lower alkyl (C1–4) esters and acid halides, for example succinic, maleic, itaconic and phthalic anhydride, dimethyl terephthalate and malonyl dichloride.

Preferred for the production of the condensed PS polyols are dicarboxylic acids and combinations of a dicarboxylic acid and a small proportion (e.g. not larger than 10 equivalent percent) of a tribasic or tetrabasic or further polybasic polycarboxylic acid.

The lactone and hydroxycarboxylic acid include those respectively enumerated hereinabove.

Examples of the alkylene carbonate include those comprising a C2–6 alkylene group, for example ethylene and propylene carbonate. Examples of the dialkyl carbonate include those comprising C1–4 alkyl groups, for example dimethyl, diethyl and di-isopropyl carbonate.

Specific examples of the OH-terminated PSs include polyethylene adipate, polybutylene adipate, polyhexamethylene adipate, polyneopentyl adipate, polyethylene/propylene adipate, polyethylene/butylene adipate, polybutylene/hexamethylene adipate, polydiethylene adipate, poly(polytetramethylene ether) adipate, polyethylene azelate, polyethylene sebacate, polybutylene azelate, polybutylene sebacate, polycaprolactone diol and polyhexamethylene carbonate diol.

The OH-terminated PDs include poly(ester)amide polyols resulting from polycondensation of a polycarboxylic acid (such as mentioned above) with a hydroxylamine (such as mentioned above) or a polyol (such as mentioned above) and a PA (to be mentioned later herein).

The OH-terminated PUs include OH-terminated urethane prepolymers resulting from modification of polyols with a PI. The polyols include the above-mentioned polyhydric alcohols, high-molecular-weight polyols (the above-mentioned OH-terminated PTs and PSs and those OH-terminated VPs and P/Ps which are to be mentioned later herein), and combinations of two or more of these. Preferred are high-molecular-weight polyols (in particular OH-terminated PSs, and particularly PTs) and combinations thereof with a low-molecular-weight polyol (in particular a polyhydric alcohol). The amount of the low-molecular-weight polyol to be used in combination may adequately be varied according to the intended use of and the performance characteristics required of the thermocrosslinkable aqueous resin dispersion. Generally, however, the amount is preferably 0.01 to 0.5 equivalent, more preferably 0.02 to 0.4 equivalent, most preferably 0.1 to 0.2 equivalent, relative to each equivalent of the high-molecular-weight polyol. In producing the OH-terminated urethane prepolymers, the equivalent ratio between polyol and PI (OH/NCO ratio) is generally 1.1 to 10, preferably 1.4 to 4, more preferably 1.4 to 2. The polyol and PI may be reacted with each other either in one step or in two or more steps (e.g. part of the polyol or PI is subjected to reaction and the remainder is then subjected to reaction).

Examples of the PI include those PIs having 2 to 6 or more (preferably 2 or 3, more preferably 2) isocyanate groups which are enumerated below, and mixtures of two or more of these.

C2–18 (exclusive of the carbon atoms in the NCO groups; hereinafter the same shall apply) aliphatic PIs: diisocyanates (hereinafter abbreviated as "DIs"), for example ethylene DI, tetramethylene DI, hexamethylene DI (HDI), heptamethylene DI, octamethylene DI, decamethylene DI, dodecamethylene DI, 2,2,4- and/or 2,4,4-trimethylhexamethylene DI, lysine DI, 2,6-diisocyanatemethyl caproate, 2,6-diisocyanateethyl caproate, bis(2-isocyanateethyl) fumarate and bis(2-isocyanateethyl) carbonate; and trifunctional and further polyfunctional PIs (triisocyanates etc.), for example 1,6,11-undecanetriisocyanate, 1,8-diisocyanate-4-isocyanatemethyloctane, 1,3,6-hexamethylenetriisocyanate and lysine ester triisocyanates (lysine-alkanolamine reaction products further reacted with phosgene), 2-isocyanateethyl-2,6-diisocyanatehexanoate, 2- and/or 3-isocyanatepropyl-2,6-diisocyanatehexanoate, etc.;

C4–15 alicyclic PIs: DIs, for example isophorone-DI (IPDI), dicyclohexylmethane-4,4'-DI (hydrogenated MDI), cyclohexylene DI, methylcyclohexylene DI, bis(2-isocyanateethyl)-4-cyclohexylene-1,2-dicarboxylate and 2,5- and/or 2,6-norbornane-DI; and trifunctional or further polyfunctional PIs (triisocyanates etc.), for example bicycloheptanetriisocyanate;

C8–15 araliphatic PIs: m- and/or p-xylylene DI (XDI), diethylbenzene-DI and α,α,α',α'-tetramethylxylylene DI (TMXDI);

C6–20 aromatic PIs: DIs, for example 1,3- and/or 1,4-phenylene DI, 2,4- and/or 2,6-tolylene DI (TDI), 4,4'- and/or 2,4'-diphenylmethane-DI (MDI), m- and p-isocyanatephenylsulfonyl isocyanate, 4,4'-diisocyanatebiphenyl, 3,3'-dimethyl-4,4'-diisocyanatebiphenyl, 3,3'-dimethyl-4,4'-diisocyanatediphenylmethane and 1,5-naphthylene DI; and trifunctional and further polyfunctional PIs (triisocyanates etc.), for example crude TDI, crude MDI (polymethylene-polyphenylene polyisocyanate); and Modifications of PIs: modifications of the above PIs (e.g. CD, urethane, urea, isocyanurate, uretimine, allophanate, biuret, oxazolidone and/or uretodione group-containing modifications), for example urethane modifications of MDI, TDI, HDI, IPDI and the like (NCO-terminated urethane prepolymers obtained by reacting a polyol with the PI in excess), further, biuret modifications, isocyanurate modifications and trihydrocarbyl phosphate modifications thereof, and mixtures of these.

Examples of the polyol to be used for urethane modification include such polyhydric alcohols, PT polyols and/or PS polyols as mentioned above. Preferred are polyols having a OH equivalent of not higher than 500, particularly 30 to 200, for example glycols (EG, PG, DEG, DPG, etc.), triols (TMP, GR, etc.), tetrafunctional and further polyfunctional polyols (PE, SO, etc.), and AO (EO and/or PO) (1 to 40 moles) adducts of these, in particular glycols and triols. The equivalent ratio between PI and polyol (NCO/OH ratio) in urethane modification is generally 1.1 to 10, preferably 1.4 to 4, more preferably 1.4 to 2.

The free isocyanate group content of the above-mentioned modified PIs is generally 8 to 33%, preferably 10 to 30%, more preferably 12 to 29%.

Preferred among the PIs from the light resistance viewpoint are non-aromatic (aliphatic, alicyclic and araliphatic) PIs, in particular aliphatic PIs, alicyclic PIs, and combinations of these.

The OH-terminated VPs include polybutadiene-based polyols, for example OH-terminated butadiene homopolymers and copolymers (styrene-butadiene copolymers, acrylonitrile-butadiene copolymers, etc.) [those having the 1,2-vinyl structure, those having the 1,4-trans structure, those having the 1,4-cis structure, and those having two or more of these structures (1,2-vinyl/1,4-trans/1,4-cis mole ratio: (100 to 0)/(100 to 0)/(100 to 0), preferably (10 to 30)/(50 to 70)/(10 to 30)) and hydrogenation products derived from these (degree of hydrogenation: e.g. 20 to 100%); acrylic polyols, for example hydroxyl group-containing acrylic copolymers [alkyl (C1–20) (meth)acrylate copolymers or such copolymers further comprising another monomer(s) (styrene, acrylic acid, etc.)] [hydroxyl group introduction being mainly based on the use of hydroxyethyl (meth)acrylate]; and partially hydrolyzed ethylene/vinyl acetate copolymers.

The P/Ps are obtained by polymerizing an ethylenically unsaturated monomer(s) in situ in a polyol(s) (such a OH-terminated PT(s) and/or PS(s) as mentioned above, or a mixture of the same and such a polyhydric alcohol(s) as mentioned above). Examples of the ethylenically unsaturated monomer include those mentioned later herein as starting monomers for producing the resins (b). Specifically, they include acrylic monomers, for example (meth)acrylonitrile and alkyl (C1–20 or higher) (meth)acrylates (methyl methacrylate etc.); hydrocarbon (hereinafter abbreviated as "HC") monomers, for example unsaturated aromatic HCs (styrene etc.) and unsaturated aliphatic HCs (C2–20 or higher alkenes, alkadienes, etc., e.g. α-olefins and butadiene); and combinations of two or more of these [e.g. acrylonitrile/styrene combination (weight ratio: 100/0 to 80/20)]. The P/Ps has a polymer content of, for example 5 to 80% or higher, preferably 30 to 70%.

Preferred among the high-molecular-weight polyols are PT polyols and PS polyols.

Examples of the coupling agent in (m212) include those having an amino or hydroxyl group-reactive group (e.g. isocyanate, epoxy, halogen-containing group) and a carboxy-reactive group (e.g. isocyanate, epoxy), for example PIs, polyepoxides (to be mentioned later herein), epihalohydrins (epichlorohydrin etc.) and epoxy alcohols (glycidol etc.).

The resins (a21) can be produced by direct reaction of (a1) with (m211) (ester bond or amide bond formation), ring opening addition of (m210) to (a1), or coupling of a polyfunctional compound with (a1) by means of the coupling agent in (m212) (urethane bond or urea bond formation, epoxy ring opening addition, or hydrogen halide elimination).

The degree of OH modification of the resins (a21) is not particularly restricted but the resins (a21) generally have a OH value of 4 to 280 (mg KOH/g; hereinafter the same shall apply). From the viewpoint of their reactivity with (c), of the adhesion between the coat film formed from the aqueous resin dispersions and plastics substrates and of the gasohol resistance of the coat film after crosslinking, the resins (a21) preferably have a OH value of 5 to 100, more preferably 10 to 80, most preferably 20 to 60.

The resins (a21) have a structure resulting from conversion of at least one carboxyl group in (a1) to one of the OH-containing groups represented, for example, by the following general formulas:

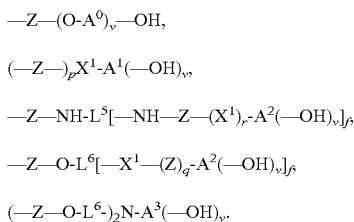

In the above formulas, v is an integer of not smaller than 1; $A^0$ is a C2–12 alkylene group or a group represented by the general formula —$CH_2$—CH(—$R^0$)—; $R^0$ is a phenyl or hydroxymethyl group or a C2–13 alkoxymethyl or acyloxymethyl group; $A^1$ is a hydroxylamine or polyol residue with a valence of (1+v) [as resulting from amino (—NHR) or hydroxyl group removal]; $A^2$ is $A^1$ or the residue of a hydroxycarboxylic acid; $A^3$ is a hydroxylamine residue (resulting from amino group removal); $L^5$ is a residue of PI with a valence of (1+f); $L^6$ is the group resulting from epoxy ring opening and having a valence of (1+f); $X^1$ is —O— (when $A^1$ or $A^2$ is a polyol or hydroxycarboxylic acid residue) or —NR— (when $A^1$ or $A^2$ is a hydroxylamine residue); R is H, a C1–10 alkyl group or a C2–4 hydroxyalkyl group; r and q each is 0 or 1 (when $A^2$ is a hydroxycarboxylic acid residue, r is 0 and q is 1; when $A^2$ is a hydroxylamine residue, r is 1 and q is 1; when $A^2$ is a polyol residue, r is 1 and q is 0); Z, f, the residue resulting from epoxy ring opening and the respective residues are as defined above referring to the general formulas for carboxy-containing groups.

Examples of the SH modifying agent (m22) include (m221) carboxy-reactive group- and mercapto group-containing polyfunctional compounds (polythiols, mercaptoamines, etc.), (m220) precursors thereof (mercapto group introducing agents etc.), (m222) combinations of a carboxy-reactive coupling agent and polyfunctional compounds having a group reactive with the coupling agent and a mercapto group(s) (polythiols, mercaptoamines, mercaptocarboxylic acids, etc.), and combinations of two or more of these.

The polythiols, mercaptoamines and mercaptocarboxylic acids include those corresponding to the above-mentioned hydroxylamines, polyols (polyhydric alcohols, OH-terminated polymers, etc.) and hydroxycarboxylic acids [substitution of SH for OH, or of SH and S for OH and O (at least part of ether bond O or carbonyl O)]. Thus, for example, mention may be made of alkanepolythiols (1,4-butanedithiol etc.), SH-terminated polymers [poly(thio)ether polythiols, poly(thio)ester polythiols, etc.], aminoalkylmercaptans (2-aminoethylmercaptan etc.), and aliphatic and aromatic mercaptocarboxylic acids (thioglycolic acid, thiomalic acid, mercaptobenzoic acid, etc.). Examples of the coupling agent include the same ones as those in (m212). The mercapto group introducing agents include hydrogen sulfide and diphosphorus pentoxide.

The resins (a22) can be produced by the method comprising modifying (a1) in the same manner as in the production of (a21) except that a SH-containing polyfunctional compound is used in lieu of the OH-containing polyfunctional compound, or the method comprising converting at least part of the hydroxyl group of (a21) to the mercapto group using a mercapto group introducing agent.

The degree of SH modification of (a22) is not particularly restricted but, from the viewpoint of the adhesion between the coat film formed from the aqueous resin dispersions and plastics substrates and of the gasohol resistance of the coat film after crosslinking, the SH equivalent (molecular weight per mercapto group) is preferably within the same range as mentioned above referring to the OH equivalent of (a21).

The resins (a22) have a structure resulting from conversion of at least one carboxyl group in (a1) to a mercapto-containing group corresponding to the above-mentioned hydroxyl-containing group in (a21) [substitution of SH for OH, or of SH and S for OH and O (at least part of ether bond O or carbonyl O)] or to a mercapto-containing group resulting from substitution of SH for at least part of OH in the above-mentioned OH-containing group.

Examples of the amino modifying agent (m23) include (m231) carboxy-reactive group- and amino group-containing polyfunctional compounds (PAs etc.), (m230) precursors thereof (blocked PAs, blocked hydroxylamines, alkyleneimines, aminoalkylating agents, etc.), (m232) combinations of a carboxy-reactive coupling agent and polyfunctional compounds having a group reactive with the coupling agent and an amino group(s) (PAs etc.) or precursors thereof (blocked PAs, blocked hydroxylamines, blocked aminocarboxylic acids, etc.); and combinations of two or more of these.

The PAs include primary and/or secondary PAs, for example aliphatic (C2–18), alicyclic (C4–15), araliphatic (C8–15) and aromatic (C6–20) PAs, which correspond to the above-mentioned PIs (except for substitution of $NH_2$ for NCO); polyalkylene (C2–6) PAs (polymerization degree: 2 to 10 or higher), for example polyethylene PAs (diethylenetriamine, triethylenetetramine, tetraethylenepentamine, etc.), and corresponding polypropylene PAs; polymerized fatty acid PAs [PAs derived from fatty acid (linolic acid, linoleic acid, oleic acid, etc.) polymers (dimer acids etc.) (by hydrogenation of the corresponding amides or nitriles)]; amino-terminated polymers (mentioned below); partial (C1–10)alkylation products and/or hydroxyl (C2–4)alkylation products derived from these PAs (N-alkyldiamines, N,N'-dialkyldiamines, N-hydroxyalkyldiamines, N,N'-dihydoxyalkyldiamines, etc.); and heterocyclic PAs, for example piperazine, imidazolidine, pyrazolidine, etc., and N-aminoalkyl and N,N'-diaminoalkyl substitution derivatives thereof (aminoethylpiperazine etc.).

The amino-terminated polymers include amino-terminated PTs, for example C3–10 (preferably C3) aminoalkyl ethers of the above-mentioned polyols (polyhydric alcohols, PT polyols, etc.) [hydrogenation products of the cyanoalkylation (cyanoethylation etc.) products]; amino-terminated PDs, for example amino-terminated condensed PDs [obtained from the above-mentioned PAs by polycondensation with a polycarboxylic acid(s) (such as mentioned above)] and amino-terminated polylactams [obtained from the above-mentioned PAs by ring opening addition of or polycondensation with an initiator and a lactam(s) or aminocarboxylic acid(s) (such as mentioned above)].

Preferred as PA are diamines (hereinafter, "DAs"), in particular aliphatic DAs. More preferred are C2–12 ones [ethylene-DA (hereinafter abbreviated as "EDA"), hexamethylene-DA, heptamethylene-DA, octamethylene-DA and decamethylene-DA]. EDA is most preferred.

The blocked PAs, blocked hydroxylamines and blocked aminocarboxylic acids respectively include polyketimines, hydroxyl group-containing ketimines and carboxyl group-containing ketimines as well as the corresponding aldimines, resulting from ketimine blocking or aldimine blocking of the amino group(s) of the above-mentioned PAs, hydroxylamines and aminocarboxylic acids using ketone or aldehyde. The ketone and aldehyde include C3–8 ketones (acetone, methyl ethyl ketone, etc.) and C2–8 aldehydes (acetaldehyde, propionaldehyde, etc.).

The alkyleneimines include C2–12 (preferably C2–6) ones, for example ethyleneimine, propyleneimine, butyleneimine and hexyleneimine.

Examples of the coupling agent include the same ones as in (m212).

The aminoalkylating agents include combinations of a cyanoalkylating agent [e.g. (meth)acrylonitrile] and a reducing agent (e.g. hydrogen).

The resins (a23) can be produced by reaction of (a1) with a (blocked) PA (amide bond formation), reaction of (a1) with a blocked hydroxylamine (ester bond formation), ring opening addition of an alkyleneimine to (a1), at least partial aminoalkylation of the hydroxyl group of (a21) (e.g. cyanoethylation with acrylonitrile and hydrogenation), or coupling of a polyfunctional compound to (a1) using such a coupling agent as in (m232) (urethane bond, urea bond or amide bond formation, epoxy ring opening addition, or hydrogen halide elimination). When a blocked PA, blocked hydroxylamine or blocked aminocarboxylic acid is used, the blocked amino group (ketimine-blocked or aldimine-blocked amino group) can be converted to an amino group by hydrolysis, if necessary.

The modification with a PA can be realized by directly reacting (a1) with the PA. The amino group in PA/carboxylic acid (anhydride) group in (a1) equivalent ratio is generally (0.1 to 2)/1, preferably (0.3 to 1.5)/1, more preferably (0.5 to 1.2)/1, most preferably 1/1. The reaction temperature is generally 120 to 230° C.

The degree of amino modification of the resins (a23) is not particularly restricted but, from the viewpoint of the adhesion between the coat film formed from the aqueous resin dispersions and plastics substrates and of the gasohol resistance of the coat film after crosslinking, the amine values (primary and secondary amine values) are generally 4 to 280 (mg KOH/g), preferably 4 to 100, more preferably 5 to 50.

The resins (a23) have a structure resulting from conversion of at least one carboxyl group in (a1) to one of the amino-containing groups represented, for example, by the general formulas given below or conversion of at least part of OH of the hydroxyl group in (a21) to an aminopropyl group ($-CH_2CH_2CH_2NH_2$). These amino groups may be partially or totally blocked (ketimine-blocked or aldimine-blocked).

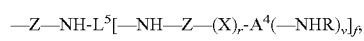

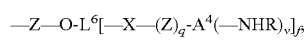

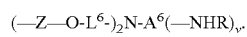

In the above formulas, $A^4$ is an aminocarboxylic acid residue with a valence of $(1+v)$ or $A^5$; $A^5$ is a hydroxylamine residue with a valence of $(1+v)$ (as resulting from hydroxyl group removal) or $A^6$; $A^6$ is a polyamine residue with a valence of $(1+v)$ [as resulting from removal of the amino group ($-NHR$)]; X is $-O-$ (when $A^4$ and $A^5$ each is a hydroxylamine or aminocarboxylic acid residue) or $-NR-$ (when $A^4$ and $A^5$ each is a polyamine residue); r and q each is 0 or 1 (when $A^4$ is an aminocarboxylic acid residue, r is 0 and q is 1; when A is a polyamine residue, r is 1 and q is 0; when $A^4$ is a hydroxylamine residue, r is 1 and q is 0); v, $L^5$, $L^6$, R, Z, f, the residue resulting from epoxy ring opening and the respective residues are as defined above (referring to the general formulas for OH-containing groups).

Examples of the NCO modifying agent (m24) include (m241) carboxy-reactive group- and isocyanate group-containing polyfunctional compounds (PIs), (m240) precursors thereof (blocked PIs, phosgene, etc.), (m242) combinations of an isocyanate-reactive group-containing or isocyanate-reactive group-forming carboxy-reactive coupling agent with PIs, and combinations of two or more of these.

The PIs include the above-enumerated PIs (aliphatic, alicyclic, araliphatic and aromatic PIs as well as modifications of those PIs) as well as NCO-terminated polymers, for example polymers (PTs, PSs, PDs, etc.) having two to eight or more active hydrogen-containing groups (e.g. hydroxyl, amino, mercapto and carboxyl groups), for example NCO-terminated polymers obtained by reacting the above-mentioned OH-terminated, SH-terminated, amino-terminated and carboxy-terminated polymers with an excess of one of the above-mentioned PIs, and NCO-terminated polymers obtained by reacting the above-mentioned amino-terminated polymers with phosgene.

The blocked PIs include those derived from the above PIs by blocking the isocyanate groups thereof partly or totally with a blocking agent [e.g. a phenol, active methylene-containing compound, lactam, oxime, bisulfide, tertiary alcohol, secondary aromatic amine, imide or mercaptan described in U.S. Pat. No. 4,524,104].

Examples of the coupling agent include isocyanate-reactive group-containing carboxy-reactive coupling agents, for example polyfunctional compounds having at least two active hydrogen-containing groups (hydroxyl, amino and/or mercapto) other than the carboxyl group [the above-mentioned polyols (polyhydric alcohols, PT polyols, etc.), polyamines, hydroxylamines and polythiols], and carboxylic acids having the above-mentioned active hydrogen-containing groups (the above-mentioned aminocarboxylic acids, hydroxycarboxylic acids and mercaptocarboxylic acids); as well as isocyanate-reactive group-forming carboxy-reactive coupling agents, for example epoxides [the above-mentioned monoepoxides (AOs, GEs, GSs and epoxy alcohols), and polyepoxides (to be mentioned later herein)].

The resins (a24) can be produced by reacting (a1), (a21), (a22) or (a23) with a (blocked) PI (amide, urethane, thiourethane or urea bond formation); reacting (a23) with phosgene; subjecting (a1) and a (blocked) PI to coupling by means of a polyfunctional compound in (m242) (ester, amide or thioester bond formation, and urethane, urea or thiourethane bond formation), subjecting (a1) and a (blocked) PI to coupling by means of an active hydrogen atom-containing group-containing carboxylic acid (ester, amide or thioester bond formation, and amide bond formation), or causing the ring opening addition of an epoxide to (a1) followed by reaction of the OH resulting from epoxy ring opening with a (blocked) PI (urethane bond formation). When a blocked PI is used, the blocked isocyanate group can be converted, if necessary, to a free isocyanate group by heating for deblocking at or above the dissociation temperature of the blocked isocyanate group.

The degree of NCO modification of the resin (a24) is not particularly restricted but, from the viewpoint of the adhesion between the coat film formed from the aqueous resin dispersions and plastics substrates and of the gasohol resistance of the coat film after crosslinking, the isocyanate content is generally 0.2 to 5%, preferably 0.4 to 4%, more preferably 0.8 to 2%.

The resins (a24) have a structure derived from (a1) by conversion of the carboxyl group thereof to an isocyanate-containing group represented, for example, by one of the general formulas given below [when (a12) has a group resulting from epoxy ring opening represented by $L^3$, by conversion of OH in that group to —O—Z—NH-$L^5$(—NCO)$_f$], a structure resulting from conversion of OH in (a21) to —O—Z—NH-$L^5$(—NCO)$_f$, a structure resulting from conversion of SH in (a22) to —S—Z—NH-$L^5$(—NCO)$_f$, or a structure resulting from conversion of the amino (—NHR) group in (a23) to —NR—Z—NH-$L^5$(—NCO)$_f$ or to an isocyanate group. These isocyanate groups may be partially or totally blocked (e.g. phenol-blocked, oxime-blocked or lactam-blocked).

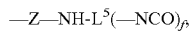—Z—NH-$L^5$(—NCO)$_f$,

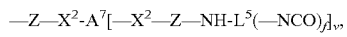—Z—X$^2$-A$^7$[—X$^2$—Z—NH-$L^5$(—NCO)$_f$]$_v$,

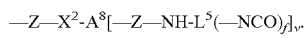—Z—X$^2$-A$^8$[—Z—NH-$L^5$(—NCO)$_f$]$_v$.

In the above formula, $A^7$ is a polyol, polyamine, hydroxylamine or polythiol residue with a valence of (1+v); $A^8$ is an aminocarboxylic acid, hydroxycarboxylic acid or mercaptocarboxylic acid residue with a valence of (1+v); $X^2$ is —O— (when $A^7$ is a polyol residue and $A^8$ is a hydroxycarboxylic acid residue), —NR'— (when $A^7$ is a polyamine residue and $A^8$ is an aminocarboxylic acid residue), —S— (when $A^7$ is a polythiol residue and $A^8$ is a mercaptocarboxylic acid residue) or one of them is —O— and the other is —NR'— (when $A^7$ is a hydroxylamine residue); R' is H or a C1–10 alkyl group; v, $L^5$, Z, f and the respective residues are as defined hereinabove (referring to the general formulas for hydroxyl-containing groups).

The CD-modified resins (a25) are produced upon CD formation by the reaction of an isocyanate group in (a24) with an isocyanate group [isocyanate group in (a24) or isocyanate group in PI] under carbon dioxide release. The CD modification is preferably carried out in the presence of a CD formation catalyst, for example a phosphorus compound such as a phospholene compound (e.g. 1-ethyl-3-methylphospholine-1-oxide), although it may be carried out at elevated temperatures without using any catalyst.

The degree of CD modification of the resins (a25) is not particularly restricted but, from the viewpoint of the adhesion between the coat film formed from the aqueous resin dispersions and plastics substrates and of the gasohol resistance of the coat film after crosslinking, the CD content is generally 0.2 to 5%, preferably 0.4 to 4%, more preferably 0.8 to 2%.

The resins (a25) have a structure resulting from conversion of at least part of the isocyanate groups (—NCO) in (a24) to —N=C=N-$L^5$(—NCO)$_f$, or a structure resulting from coupling of two (or more) molecules of (a24) via —N=C=N—, for example a structure resulting from conversion of -$L^5$(—NCO)$_f$ in the isocyanate-containing group in a PI-modified (a24) or -$A^4$(—NCO)$_v$ in the isocyanate-containing group in a phosgene-modified (a24) to a group represented by the general formula given below, respectively:

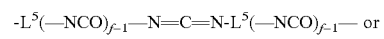 -$L^5$(—NCO)$_{f-1}$—N=C=N-$L^5$(—NCO)$_{f-1}$— or

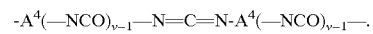 -$A^4$(—NCO)$_{v-1}$—N=C=N-$A^4$(—NCO)$_{v-1}$—.

Examples of the modifying agent (m3) for polymer moiety introduction include monofunctional polymers having only one carboxy-reactive group, precursors thereof, combinations of a carboxy-reactive coupling agent and a monofunctional polymer having only one group reactive with the coupling agent, and combinations of two or more of these.

Examples of the above-mentioned carboxy-reactive group include hydroxyl, mercapto, amino, isocyanate and CD groups. Examples of the above-mentioned carboxy-reactive coupling agent include the same coupling agents as mentioned hereinabove referring to (m2); and examples of the reactive group of the monofunctional polymer to be used in combination with the coupling agent include the same ones as mentioned hereinabove referring to (m2).

Examples of the monofunctional polymer (m3) include monofunctional OH-terminated polymers (m31), SH-terminated polymers (m32), amino-terminated polymers (m33), NCO-terminated polymers (m34) and CD-containing polymers (m35), which respectively correspond to the OH-terminated polymers, SH-terminated polymers, amino-terminated polymers, NCO-terminated polymers and CD-containing polymers mentioned hereinabove referring to (m2) (being the same as these except that they are monofunctional). Examples of the monofunctional polymer to be used in combination with the coupling agent include, in addition to these, monofunctional carboxy-terminated polymers (m30).

These monofunctional polymers include the following. They can be produced in the same manner as the respective functional group-containing polymers (m2) except that a monofunctional compound is used as the initiator or a monofunctional compound is used as part of the polymerization (polycondensation, polyaddition) composition (or as a reaction terminator). The AOs, various polyols, polycarboxylic acids, lactones, hydroxycarboxylic acids, lactams, aminocarboxylic acids, PAs, PIs, mercapto-introducing agents and aminoalkylating agents, for example, which are to be used in the production of such polymers respectively include those mentioned hereinabove referring to (m2); and examples of the monofunctional compound include the following: compounds having one active hydrogen atom, for example C1–20 or higher monohydric alcohols [e.g. (cyclo)alkanols (methanol, cyclohexanol, etc.), aralkyl alcohols (benzyl alcohol etc.), cellosolve species and carbinols (to be mentioned later herein)], monohydric phenols (phenol, cresol, alkylphenols, styrenated phenol, etc.), secondary monoamines (dialkylamines, morpholine, etc.) and monocarboxylic acids [aliphatic monocarboxylic acids (fatty acids such as acetic acid, propionic acid and butyric acid, and alkoxyfatty acids such as methoxyacetic acid), and aromatic monocarboxylic acids (e.g. benzoic acid)]; C1–20 or higher monoamines (alkylamines, benzylamine, aniline, etc.); C1–20 or higher monoisocyanates (alkyl isocyanates, benzyl isocyanate, phenyl isocyanate, etc.).

The modifying polymers (m31) include PT monools, for example polyoxyalkylene monools (e.g. AO adducts, monocarboxylic acid esters of PAG) having a structure resulting, for example, from addition of an AO to an initiator having one active hydrogen atom (e.g. monohydric alcohol, monohydric phenol, secondary monoamine, monocarboxylic acid); PS monools, for example PL monools [products of ring opening addition of a lactone to monools (monohydric alcohols or PT monools) (or products of polycondensation with a hydroxycarboxylic acid)], and condensed PS monools (products of polycondensation of polyols with a monocarboxylic acid and a polycarboxylic acid, and products of partial esterification of PS polyols with a monocarboxylic acid); PD monools, for example condensed PD monools [products of polycondensation of a monocarboxylic acid and a polyol with a PA, and products of partial esterification of poly(ester)amide polyols with a monocarboxylic acid]; and PU monools, for example polyadditon products from the above-mentioned monools and polyols and a PI, and polyaddition products from polyols and a monoisocyanate].

Examples of the (m32) include polymers corresponding to (m31) [as resulting from substitution of SH for OH, or of SH and S for OH and O (at least part of ether bond O or carbonyl O)], for example products of mercapto introduction into (m31).

Examples of the (m33) include PT monoamines, for example C3–10 aminoalkyl ethers of (m31) [hydrogenated cyanoethylation products]; PD monoamines, for example polylactam monoamides [products of ring opening addition of a lactam to a monoamine (or products of polycondensation of an aminocarboxylic acid)], and condensed PD monoamines (products of polycondensation of a PA with a polycarboxylic acid and a monocarboxylic acid or monoamine).

Examples of the (m34) include polyaddition products from a monool and polyol and a PI, and partial polyaddition products from a polyol and a monoisocyanate. Examples of the (m35) include CD modifications of (m34).

Examples of the (m30) include PT monocarboxylic acids, for example PT monool carboxymethyl ethers; PD, PS and/or PU monocarboxylic acids, for example PL monocarboxylic acids and polylactam monocarboxylic acids resulting from ring opening addition of a lactone or lactam to a monocarboxylic acid (or polycondensation of a hydroxycarboxylic acid or aminocarboxylic acid), condensed PS monocarboxylic acids and condensed PD monocarboxylic acids resulting from coupling (esterification or amidation) of a monocarboxylic acid and a polycarboxylic acid with a polyol, PA or PI, and PU ester monocarboxylic acids and PU amide monocarboxylic acids resulting from reaction (urethane formation and esterification or amidation) of a polycarboxylic acid and a monool with a PI.

The polymer moiety-containing resins (a) can be produced by the method comprising reacting a polyfunctional or monofunctional polymer (one or more of PT, PS, PD and PU) produced in advance as a modifying agent [(m12) or (m2) or (m3)] with a resin (a1) [(a11) or (a12)] either directly or via a coupling agent; or by the method comprising forming the polymer moiety by in situ polymerization (e.g. ring opening polymerization, polycondensation, polyaddition) of a precursor(s) of the polymer in the presence of (a1).

The production of the above-mentioned polymer and the polymer moiety formation using the precursor(s) thereof can be carried out under the conventional polymerization (e.g. ring opening polymerization, polycondensation, polyaddition) conditions.

Examples of the method comprising using a polymer as the modifier and reacting the same with (a1) include, for example, 1) the method comprising mixing (a1) in molten state with the polymer, if necessary together with a coupling agent, and heating the mixture, 2) the method comprising mixing (a1) in solution form with the polymer, if necessary together with a coupling agent, and heating the mixture, and 3) the method comprising heating and kneading (a1) and the polymer, if necessary together with a coupling agent in a twin-screw extruder. The heating temperature may vary depending on the reactivity of the polymer and the type of reaction, for example. Generally, however, it is 40 to 280° C., preferably 80 to 200° C. in the case of 1), it is generally 40 to 200° C., preferably 70 to 150° C. in the case of 2), and it is generally 80 to 150° C. in the case of 3). The solvent to be used in the method 2) is toluene, xylene or the like. While the pressure may vary depending on the type of reaction, for example, the reactions other than polycondensation are preferably carried out at ordinary pressure or under pressure, namely at 0 to 0.8 MPa, more preferably 0 to 0.4 MPa, from the safety and economy viewpoint. The polycondensation is generally carried out at ordinary pressure or under reduced pressure. Among these methods, the method 2) is preferred from the viewpoint that the reaction can be carried out uniformly with slight byproduct formation, for example.

The resins (a) have a Mn of at least 1,500, preferably 1,500 to 20,000, more preferably 2,000 to 12,000. At below 1,500, the coat film formed by applying the thermocrosslinkable resin dispersion of the invention to plastics substrates will be poor in gasohol resistance.

From the film-forming ability viewpoint, the resins (a) preferably have a melting point of not lower than −45° C., more preferably not lower than −40° C., still more preferably not lower than 0° C., most preferably not lower than 10° C., and preferably not higher than 120° C., more preferably not higher than 110° C., most preferably not higher than 90° C. The aqueous thermocrosslinkable dispersion containing (a) is applied to the substrate surface, then dried at 40 to 270° C. and, after application of a topcoat composition thereon, subjected to baking (baking proper). When those (a) which have such a melting point as mentioned above are used, it is possible to form coat films before topcoat composition application.

From the viewpoint of the film forming ability of the aqueous resin dispersion upon application onto substrates and of the gasohol resistance, water resistance and adhesion to substrates of the coat films, the polymer moiety-containing resins (a) preferably have a polymer moiety content of 1% to 80%, preferably 5% to 60%, most preferably 10% to 50%.

[Vinyl Resin (b)]

The vinyl resin (b), which is used in addition to the resin (a) according to need, is a resin resulting from polymerization (homopolymerization or copolymerization) of one or more ethylenically unsaturated monomers. The ethylenically unsaturated monomers include the following (b1) to (b6).

(b1) Unsaturated HCs:

(b11) Aliphatic HCs (C2–18 or higher): alkenes, for example ethylene, propylene, (iso)butene, pentene, heptene, diisobutylene, octene, dodecene, octadecene and other α-olefins; dienes, for example butadiene, isoprene, 1,4-pentadiene, 1,6-hexadiene and 1,7-octadiene); (b12) alicyclic HCs (C4–18 or higher): (di)cycloalkenes, for example cyclohexene, (di)cyclopentadiene, pinene, limonene, indene, vinylcyclohexene and ethylidenebicycloheptene; and (b13) aromatic HCs (C8–20 or higher): styrene, homologs thereof, for example α-methylstyrene, 2,4-dimethylstyrene, ethylstyrene, isopropylstyrene, butylstyrene, phenylstyrene, cyclohexylstyrene, benzylstyrene, vinyltoluene, crotylbenzene, polyvinyl-aromatic HCs (divinylbenzene, divinyltoluene, divinylxylene, trivinylbenzene, etc.), and vinylnaphthalene.

(b2) Alkyl (meth)acrylates: those having a C1–50 alkyl group, for example methyl, ethyl, propyl, butyl, 2-ethylhexyl, dodecyl, hexadecyl, heptadecyl and eicosyl (meth)acrylate.

(b3) Carboxyl group-containing vinyl monomers:

(b31) Unsaturated monocarboxylic acids and (b32) unsaturated dicarboxylic acids, and anhydrides thereof, for example those enumerated hereinabove referring to (m11) [(meth)acrylic acid, (iso)crotonic acid, cinnamic acid, maleic acid (anhydride), fumaric acid and itaconic acid (anhydride), etc.]; (b33) dicarboxylic acid monoesters: monoalkyl (C1–18 or higher) esters of the above-mentioned dicarboxylic acids, for example monoalkyl esters of maleic, fumaric, itaconic, and citraconic acid; and (b34) salts of the above-mentioned (b31), (b32) and (b33), for example alkali metal (sodium, potassium, etc.) salts, alkaline earth metal (calcium, magnesium, etc.) salts, ammonium salts, amine (C2–24) salts and quaternary ammonium (C4–24) salts, etc.

(b4) Carbonyl-, ether- and/or sulfur-containing unsaturated monomers:

(b41) Unsaturated esters: (b411) unsaturated esters [vinyl, isopropenyl, (meth)allyl and vinylphenyl esters] of carboxylic acids (e.g. the above-enumerated aliphatic and aromatic mono- and polycarboxylic acids): aliphatic esters (C4–15), for example vinyl esters (e.g. acetate, propionate, butyrate, methoxyacetate and benzoate), isopropenyl esters (e.g. acetate) and (meth)allyl esters (e.g. diallyl adipate); and aromatic unsaturated esters (C9–20), for example diallyl phthalate, methyl-4-vinylbenzoate and acetoxystyrene; and (b412) unsaturated carboxylic acid esters [other than those (b2) mentioned above]: (b4121) straight or branched or alicyclic C1–22 (cyclo)alkyl group-containing (cyclo)alkyl esters of unsaturated monocarboxylic acids other than (meth)acrylic acid [such as the above-mentioned (b31)], cycloalkyl (meth)acrylates and di(cyclo)alkyl esters of unsaturated dicarboxylic acids [such as the above-mentioned (b32)], for example alkyl (iso)crotonates, cyclohexyl (meth)acrylate, and dialkyl fumarates and maleates; and (b4122) (poly)oxyalkylene (C2–4) group (polymerization degree: 1 to 30)-containing esters of unsaturated carboxylic acids [such as the above-mentioned (b31) and (b32)], for example mono- and di(meth)acrylates of the above-mentioned dihydric alcohols [C2–12 alkylene glycols etc.] [e.g. hydroxyethyl (meth)acrylate], mono- and di(meth)acrylates of the above-mentioned PT diols [PAGs (Mn 106 to 1,000), for example PEG (Mn 300) and PPG (Mn 500), and aromatic ring-containing polyoxyalkylene diols, for example bisphenol A-EO and/or PO adducts], (meth)acrylates of the above-mentioned PT monools [polyoxyalkylene monools having a structure resulting from addition of an AO(s) to an initiator having one active hydrogen atom, such as a monohydric alcohol or a monohydric phenol, for example polyoxyalkylene alkyl (C1–18) ethers: methyl alcohol-EO (10 moles) adduct, lauryl alcohol-EO (30 moles) adduct]; and (iso)crotonates, fumarates and maleates corresponding thereto;

(b42) Unsaturated ethers: (b421) aliphatic alkenyl and alkadienyl ethers (C3–20): vinyl ethers (hereinafter abbreviated as "VEs"), for example alkyl (C1–10) VEs (e.g. methyl, ethyl, propyl, butyl and 2-ethylhexyl VE); (poly)oxyalkylene (C2–4) group (polymerization degree 1 to 30)-containing alkenyl ethers (e.g. VEs), for example (poly)alkoxy (C1–6)alkyl(C1–4) VEs (e.g. 2-methoxyethyl VE, 2-butoxyethyl VE, 2-butoxy-2'-vinyloxydiethyl ether and 2-ethylmercaptoethyl VE); methoxybutadiene; and (meth)allyl ethers, for example poly(C2–4)(meth)allyloxyalkanes (C2–6) [e.g. di-, tri- and tetra(meth)allyloxyethane, tetra(meth)allyloxypropane and tetra(meth)allyloxybutane]; (b422) unsaturated aromatic ethers (C8–20), for example phenyl VE and phenoxystyrene; and (b423) unsaturated heterocyclic ethers, for example 3,4-dihydro-1,2-pyran;

(b43) Vinyl ketones: aliphatic vinyl ketones (C4–25) and aromatic vinyl ketones (C9–21), for example methyl vinyl, ethyl vinyl, divinyl and phenyl vinyl ketone;

(b44) Sulfide bond-containing monomers (C4–20): sulfides corresponding to (b42), for example divinyl sulfide, p-vinyldiphenyl sulfide and vinyl ethyl sulfide;

(b45) Sulfone group-containing monomers (C4–25): (b451) unsaturated sulfones and sulfoxides, for example vinyl ethyl sulfone, divinyl sulfone and divinyl sulfoxide; and (b452) unsaturated sulfonic acids, for example alkenesulfonic acids [e.g. vinylsulfonic acid and (meth)allylsulfonic acid], unsaturated aromatic sulfonic acids (e.g. styrenesulfonic acid and α-methylstyrenesulfonic acid), alkenyl and alkyl(C1–18) alkenyl esters of sulfocarboxylic acids (e.g. α-sulfoalkanoic acids and sulfosuccinic acid) [e.g. methyl vinyl, propyl (meth)allyl and stearyl (meth)allyl sulfosuccinate, and (meth)allyl sulfolaurate], sulfo(hydroxyl)alkyl (meth)acrylates and the corresponding (meth)acrylamides [e.g. sulfoethyl and sulfopropyl (meth)acrylate, 3-(meth)acryloyloxy-2-hydroxypropanesulfonic acid, 2-(meth)acrylamido-2-methylpropanesulfonic acid and 3-(meth)acrylamido-2-hydroxypropanesulfonic acid.

(b5) Phosphorus-containing unsaturated monomers (C5–30):

(b51) Phosphate group-containing unsaturated monomers, for example (meth)acryloyloxyalkyl (C1–24) mono- and diphosphates, e.g. 2-(meth)acryloyloxyethyl phosphate and phenyl-2-(meth)acryloyloxyethyl phosphate; (b52) phosphonic acid group-containing unsaturated monomers, for example (meth)acryloyloxyalkane(C1–24)phosphonic acids, e.g. 2-acryloyloxyethylphosphonic acid; and (b5) salts of the above-mentioned (b51) and (b52) [the same salts as enumerated above under (b34)].

(b6) Nitrogen-containing monomers:

(b61) Amide group-containing monomers: (meth)acrylamide monomers (C3–20), for example (meth)acrylamides [exclusive of those mentioned later herein under (b7)]; N-alkyl(C1–6)(meth)acrylamides, for example N-methyl (meth)acrylamide, N-butyl(meth)acrylamide, diacetone acrylamide, N,N'-methylenebis(meth)acrylamide; N,N-dialkyl(C1–6)- or diaralkyl(C7–15)(meth)acrylamides, for example N,N-dimethylacrylamide, N,N-dibenzylacrylamide; amide group-containing vinyl monomers (C4–20) other than the above-mentioned (meth)acrylamide monomers, for example methacrylformamide, N-methyl-N-vinylacetamide, cinnamamide, cyclic amides (N-methylpyrrolidone etc.), quaternary ammonium group-containing vinyl monomers [quaternization products (quaternization with a quaternizing agent such as methyl chloride, dimethyl sulfate, benzyl chloride and dimethyl carbonate) derived from tertiary amino group-containing vinyl monomers such as dimethylaminoethyl(meth)acrylamide, diethylaminoethyl(meth) acrylamide];

(b62) (Meth)acrylate monomers (C5–20); primary or secondary amino group-containing (meth)acrylates, for example aminoalkyl (C1–6) (meth)acrylates [e.g. aminoethyl (meth)acrylate], alkyl(C1–6)aminoalkyl (C1–6) (meth) acrylates [e.g. tert-butylaminoethyl methacrylate]; tertiary amino group-containing (meth)acrylates, for example dialkyl(C1–4)aminoalkyl (C1–4) (meth)acrylates [e.g. dimethylaminoethyl (meth)acrylate, diethylaminoethyl (meth) acrylate, di-tert-butylaminoethyl methacrylate, morpholinoethyl (meth)acrylate]; quaternary ammonium group-containing (meth)acrylates, for example quaternization products (quaternization with such a quaternizing agent as mentioned above) derived from tertiary amino group-containing (meth)acrylates such as dimethylaminoethyl (meth) acrylate and diethylaminoethyl (meth)acrylate; methyl-α-acetaminoacrylate;

(b63) Heterocyclic ring-containing monomers; pyridine compounds (C7–14), for example 4-vinylpyridine, 2-vinylpyridine; imidazole compounds (C5–12), for example N-vinylimidazole); pyrrole compounds (C6–13), for example N-vinylpyrrole;

(b64) Nitrile group-containing monomers (C3–15); for example (meth)acrylonitrile, cyanostyrene, cyanoalkyl (C1–4) acrylates;

(b65) Other nitrogen-containing monomers; nitro group-containing monomers (C8–16), for example nitrostyrene.

(b7) Hydroxyl group-containing monomers;

(b71) Styrenic monomers (C8–15), for example hydroxystyrene;

(b72) (Meth)acrylamide type monomers (C4–10), for example N-methylol(meth)acrylamide;

(b73) Unsaturated carboxylic acid esters (C5–12), for example hydroxyalkyl (C1–6) (meth)acrylates [e.g. hydroxyethyl (meth)acrylate, hydroxypropyl (meth)acrylate]; poly(n=2 to 30)oxyalkylene (C2–4) chain-containing, hydroxyl group-containing monomers [e.g. polyoxyalkylene mono(meth)acrylates [e.g. poly(n=10)oxyethylene mono (meth)acrylate]]; poly(n=2 to 30)oxyalkylene (C2–4) unsaturated carboxylic acid (di)esters [e.g. poly(n=10)oxyethylene maleic acid (di)ester]; poly(n=2 to 30)oxyalkylene (C2–4) (meth)allyl ethers, for example poly(n=10)oxyethylene (meth)allyl ether;

(b74) Alcohols (C3–8), for example (meth)allyl alcohol, crotyl alcohol, isocrotyl alcohol, 1-buten-3-ol, 2-butene-1, 4-diol;

(b75) Hydroxyl group-containing ethers (C5–20), for example hydroxyalkyl (C1–6) alkenyl (C3–6) ethers, for example 2-hydroxyethyl propenyl ether, allyl ethers of polyhydric alcohols (such as mentioned above) (e.g. sucrose allyl ethers).

Among the vinyl resins (b), (co)polymers of one or more monomers selected from the group consisting of (b1), (b2) and (b3), in particular copolymers of (b2) and (b3), are preferred from the viewpoint of the compatibility with (a) and of the gasohol resistance of the coat film. It is preferable that (b3) be used in an amount of 0.5 to 30%, more preferably 2 to 20%, and (b2) in an amount of at least 70%, more preferably 80 to 98%, based on the weight of all the monomers constituting (b). Most preferred are long-chain alkyl (C6–24) (meth)acrylate [in particular dodecyl methacrylate (hereinafter abbreviated as "DM")]/short-chain alkyl (C1–5) (meth)acrylate [in particular butyl acrylate (hereinafter, "BA")]/unsaturated monocarboxylic acid [in particular acrylic acid (hereinafter, "AA")] copolymers. The short-chain alkyl (meth)acrylate is used preferably in an amount of 5 to 40%, more preferably 8 to 30%.

From the coat film gasohol resistance viewpoint, the resin (b) preferably has a Mn of at least 700 (more preferably at least 3,000, most preferably at least 4,000) and a Tg of not lower than −65° C. (more preferably not lower than −63° C., most preferably not lower than −60° C.). From the viewpoint of the melt viscosity of the mixture with (a), of the film forming ability on the occasion of application to substrates, and of the adhesion to topcoat films, (b) should have a Mn of not higher than 40,000, preferably not higher than 30,000, more preferably not higher than 25,000, still more preferably not higher than 15,000, most preferably not higher than 12,000, and should have a Tg of not higher than 40° C., more preferably not higher than 30° C., still more preferably not higher than 20° C.

The resins (b) can be produced by polymerizing the monomer(s) mentioned above by any of the conventional polymerization techniques, for example by solution polymerization, bulk polymerization, suspension polymerization, emulsion polymerization, or a combination of bulk polymerization and solution polymerization. Among these, solution polymerization is preferred from the viewpoint that when carried out in the manner of boiling point polymerization at a certain constant level of pressure, it can give uniform polymers while the temperature is stabilized and that, after mixing with (a), the mixture can be made into an aqueous dispersion.

Examples of the solvent to be used in solution polymerization include non-water-miscible solvents, for example aliphatic HCs (e.g. pentane, hexane, cyclohexane), aromatic HCs (e.g. benzene, toluene, xylene), esters (e.g. ethyl acetate, butyl acetate, ethyl lactate, ethyl-3-ethoxypropionate), ketones (e.g. methyl isobutyl ketone, cyclohexanone), and halogen-containing HCs (e.g. 1,1,1-trichloroethane, trichloroethylene, tetrachloroethylene); and water-miscible solvents, for example water, alcohols (e.g. methanol, ethyl alcohol, isopropyl alcohol), glycols (e.g. methylcellosolve, ethylcellosolve, butylcellosolve, diethylene glycol monomethyl ether, diethylene glycol monoethyl ether), and amides (e.g. N-methylpyrrolidone, 2-pyrrolidone, dimethylformamide, N,N-dimethylacetamide). Toluene and xylene are preferred among them since they can be used in preparing aqueous dispersions as well and can be distilled off with ease.

The polymerization is generally carried out in the presence of a polymerization initiator, if necessary together with a chain transfer agent. Examples of the polymerization initiator is not particularly restricted but include azo type initiators (e.g. azobisisobutyronitrile, azobisisovaleronitrile); peroxide type initiators [monofunctional polymerization initiators having one peroxide bond in each molecule, for example dicumyl peroxide (hereinafter abbreviated as "CPO"), benzoyl, di-tert-butyl and lauroyl peroxide; polyfunctional polymerization initiators having two or more peroxide bonds in each molecule, for example 2,2-bis(4,4-di-tert-butylperoxycyclohexyl)propane, 1,1-bis(tert-butylperoxy)-3,3,5-trimethylcyclohexane and di-tert-butylperoxy hexahydroterephthalate; and polyfunctional polymerization initiators having one or more peroxide bonds and one or more polymerizable unsaturated groups within each molecule, for example diallyl peroxydicarbonate and tert-butylperoxy allyl carbonate]; and redox type initiators [combinations of such a peroxide as mentioned above and a reducing agent, for example benzoyl peroxide, and dimethylaniline]. Among these, azo initiators and monofunctional peroxide initiators having one peroxide group within each molecule, in particular CPO, are preferred from the viewpoint of compatibility with vinyl resins (b).

Examples of the chain transfer agent include thiols (C3–24, for example n-butylmercaptan, n-dodecylmercaptan, tert-hexadecanethiol), and alcohols (C3–24, for example isopropyl alcohol, decanol, hexadecanol). Among these, n-dodecylmercaptan is preferred.

The polymerization can be carried out in the conventional manner under conventional conditions. For example, the monomer(s) is (are) dissolved in a solvent, if necessary in admixture with a chain transfer agent, the mixture or solution is heated (e.g. to 20 to 220° C.), the polymerization initiator or a solution thereof in a solvent (the same as or different from the above solvent) is added gradually or dropwise (e.g. over 0.5 to 6 hours), and the reaction is continued with heating (e.g. at 70 to 220° C. for 0.5 to 48 hours).

[Resin Component]

The resin component contained in the dispersed phase and constituting the particles (I) in the aqueous thermocrosslinkable resin dispersion of the invention is a substantially homogeneous resin (composition) comprising the resin (a) or a mixture thereof with the resin (b).

The content of (a) in the resin component may be varied within a wide range (e.g. 10 to 100%). From the viewpoint of the gasohol resistance of coat film formed by application of the aqueous thermocrosslinkable resin dispersion to substrates and the adhesion of such coat films to the substrates, however, the resin component preferably comprises (a) in a proportion of at least 50% (more preferably at least 60%, in particular at least 65%), still more preferably at least 70% (in particular at least 75%), most preferably at least 80%. From the film forming ability viewpoint, the resin component preferably comprises (b) in a proportion of at least 1%, more preferably at least 3%, still more preferably at least 5%, most preferably at least 10%.

The resin component may contain one or more further constituent in a proportion such that the effects of the invention will not be reduced. The proportion of the further constituents is preferably not higher than 50% by weight, more preferably not higher than 20% by weight, most preferably not higher than 10% by weight, based on the weight of the resin component. As the further constituents, there may be mentioned those resins of which plastics substrates are made among the substrates to be mentioned later herein to which the thermocrosslinkable resin dispersion of the invention can be applied, for example polyolefin resins.

The resin component generally has a melting point or thermosoftening point of −45 to 120° C., preferably −40 to 100° C., more preferably −35 to 80° C. The melting point or thermosoftening point is measured by the-differential scanning calorimetric (DSC) method. Preferred in the case of a mixture of (a) and (b) are resin compositions homogenous in structure without such a heterogeneous structure as a core/shell structure [no heterogeneous structure being observed under an electron microscope at a magnification of 5,000]. They do not show such a plurality of distinct melting points or thermosoftening points [the melting point or thermosoftening point of (a) and the melting point or thermosoftening point of (b)] as in the case of core/shell structures but show only one melting point or thermosoftening point or, even when they show a plurality of melting points or thermosoftening points, those points are substantially lower (for example by at least 10% or by at least 10° C.) than the melting point or thermosoftening point of (a) alone.

[Crosslinking Agent (c)]

The crosslinking agent (c) has at least two groups reactive with the resin (a).

From the viewpoint of the storage stability of the aqueous dispersion and of the gasohol resistance of coat film, it is desirable that (c) can react with (a) at temperatures of not lower than 60° C., preferably not lower than 70° C., more preferably not lower than 80° C. When the agent (c) reactive with (a) at such temperatures is used, it becomes possible to react (a) with (c) at a temperature of 60 to 180° C., preferably 70 to 150° C., more preferably 80 to 120° C.

Examples of such group reactive with (a) include hydroxyl, amino, epoxy and CD groups as well as combinations of two or more of these groups. Preferred from the viewpoint of the reaction temperature, reaction rate and no byproduct formation are epoxy and CD groups and the combination of these.

Examples of the (c) include the (c1), (c2) and (c3) mentioned below and combinations of two or more of them; an appropriate one may be selected according to the functional group(s) of (a). Among them, (c1) and (c2) are preferred.

(c1) Polyepoxides:

(c11) Aliphatic polyepoxides: poly-GEs of aliphatic polyols [such dihydric to octahydric or further polyhydric alcohols and PT polyols as mentioned above referring to (m21)]: di-GEs [e.g. di-GEs of EG, PG, 1,4-BD, HD, MPD, DEG, NPG, PEG (Mn 150 to 200,000) and PPG (Mn 134 to 200,000)], tri-GEs [e.g. tri-GEs of GR and TMP], and tetravalent or higher polyvalent GEs [e.g. PE tetra-GE and SO hexa-GE]; poly-GSs of aliphatic polycarboxylic acids (dibasic or tribasic or further polybasic aliphatic polycarboxylic acids such as mentioned hereinabove referring to the productions of PSs) [e.g. oxalic acid and adipic acid di-GS, and tricarballylic acid tri-GS], and glycidyl (meth)acrylate polymers and copolymers of glycidyl (meth)acrylates and another monomer [the above-mentioned (b1), (b2), (b4), etc., preferably (b2)] (Mn being preferably 300 to 10,000, more preferably 500 to 5,000; comonomer ratio being preferably 2/98 to 80/20, more preferably 5/95 to 50/50); epoxidized animal and vegetable oils (e.g. epoxidized soybean oil);

(c12) Alicyclic polyepoxides: C8–20 ones, for example vinylcyclohexene dioxide, limonene dioxide, dicyclopentadiene dioxide, bis(2,3-epoxycyclopentyl) ether, EG bisepoxydicyclopentyl ether, 3,4-epoxy-6-methylcyclohexylmethyl-3',4'-epoxy-6'-methylcyclohexanecarboxylate, bis(3, 4-epoxy-6-methylcyclohexylmethyl) adipate, and nucleus hydrogenation products derived from the (c14) species mentioned below;

(c13) Heterocyclic ring-containing polyepoxides: C5–20, for example trisglycidylmelamine;

(c14) Aromatic ring-containing polyepoxides: poly-GEs of polyhydric phenols (dihydric or trihydric or further polyhydric phenols such as mentioned hereinabove as initiators for AO addition) or AO adducts thereof: di-GEs of dihydric phenols (di-GEs of bisphenol F, A, B, AD and S, catechol di-GE, resorcinol di-GE, hydroquinone di-GE, 1,5-dihydroxynaphthalene di-GE, dihydroxybiphenyl di-GE, di-GE obtained by reacting two moles of bisphenol A with 3 moles of epichlorohydrin, etc.); tri-GEs of trihydric phenols (pyrogallol tri-GE etc.); and poly-GEs of tetrahydric or further polyhydric phenols (GEs of phenol or cresol novolak resins, poly-GEs of polyphenols obtained by condensation reaction between phenol and glyoxal, glutaraldehyde or formaldehyde, and poly-GEs of polyphenols obtained by condensation reaction between resorcinol and acetone, etc.), etc.

Among these, aliphatic polyoepoxides and aromatic ring-containing polyepoxides, in particular TMP tri-GE, glycidyl (meth)acrylate polymers [(co)polymers from 10 to 100% of glycidyl (meth)acrylate and 0 to 90% of another monomer [the above-mentioned (b2), in particular dodecyl methacrylate]; Mn 500 to 5,000] and bisphenol A di-GE, are preferred from the viewpoint of compatibility with (a).

From the viewpoint of reactivity with (a) and of the gasohol resistance of coat film formed by application of the aqueous thermocrosslinkable resin dispersion to plastics substrates, (c1) should preferably have an epoxy equivalent of 50 to 500, in particular 60 to 200.

(c2) Poly-CDs:

CD modifications of PIs, for example poly-CDs obtained by CD modification of aliphatic, alicyclic, araliphatic and aromatic PIs (preferably DIs) such as mentioned hereinabove referring to the production of OH-terminated PUs in the same manner as described above referring to (a25).

The (c2) generally has a CD content of 0.5 to 80%, preferably 5 to 60%, more preferably 10 to 40%.

From the viewpoint of compatibility with (a), CD modifications of aliphatic PIs (in particular tetramethylene DI and HDI) are preferred.

(c3) Other crosslinking agents:

(c31) Hydroxylamines, for example those mentioned hereinabove referring to (m21);

(c32) Polyols, for example those mentioned hereinabove referring to (m21); and (c33) PAs, for example those mentioned hereinabove referring to (m23).

The number (average) of functional groups of (c3) is generally 2 to 100, preferably 3 to 20.

The equivalent [Mn per functional group (OH, $NH_2$, NH) of (c3) is generally 30 to 10,000, preferably 100 to 5,000. [The OH value of (c32) is generally 5 to 1,810, preferably 20 to 1,810. The primary or secondary amine value of (c33) is generally 5 to 1,870, preferably 20 to 1,870.]

[Aqueous Medium]

Examples of the aqueous medium which constitutes a continuous phase in the thermocrosslinkable resin dispersion of the invention include water and mixtures of water and an organic solvent. The concentration of the organic solvent in the aqueous medium is generally 0 to 50%, preferably 0 to 30%, more preferably 0 to 10%.

Examples of the organic solvent which may occur in the aqueous medium include hydrophilic organic solvents, for example alcohols, ethers, ketones, esters, amides and other solvents, and mixtures of two or more of these. The hydrophilic organic solvents include those which are miscible with water at room temperature (25° C.; hereinafter the same shall apply) and those which can be dissolved in water at a level of at least the concentration of the organic solvent in the aqueous medium. Those solvents which do not react with the (a), (b) and (c) employed are preferably used. Specific examples of such solvents include the following.

1) Ether type solvents (C3–18 or higher): mono- and dialkyl ethers of glycols [such (di)alkylene glycols as mentioned above, for example EG, DEG, PG and DPG], for example cellosolve species, e.g. methyl-, ethyl-, (iso)propyl-, n-, sec-, iso- and tert-butyl- and hexylcellosolve, and carbitols, for example methyl-, (di)ethyl- and (di)butylcarbitol; dialkyl ethers, for example (iso)propyl, (iso)butyl and methyl (iso)butyl ether; and cyclic ethers, for example THF and dioxane;

2) Ketone type solvents (C3–17 or higher): dialkyl ketones, for example acetone, methyl ethyl ketone, methyl isopropyl ketone and methyl isobutyl ketone; and cyclic ketones, for example cyclohexanone;

3) Alcohol type solvents (C1–18 or higher): aliphatic alcohols, for example methanol, ethanol, and n- and isopropanol, as well as alicyclic alcohols, for example cyclohexanol;

4) Ester type solvents (C3–18 or higher): aliphatic carboxylic acid alkyl esters, for example ethyl, propyl and butyl acetate, and methyl and ethyl propionate; and aliphatic carboxylic acid esters of such (di)alkylene glycol monoalkyl ethers (cellosolves etc.) as mentioned above, for example methyl-, ethyl- and butylcellosolve acetate;

5) Amide type solvents (C1–18 or higher), for example dimethyl- and diethylformamide, dimethylacetamide, tetramethyleneurea, methylpyrrolidone and hexamethylphosphoramide; and 6) Other organic solvents: for example sulfoxide type solvents (C2–18 or higher), e.g. dimethyl sulfoxide.

Preferred among these from the viewpoint of the storage stability of the aqueous dispersion and of the gasohol resistance of coat film are one or more organic solvents selected from among alcohols, esters, amides and, in particular cellosolves and ketones.

[Particles (I) and (II)]

The dispersed phase in the thermocrosslinkable resin dispersion of the invention comprises resin component particles (I) and crosslinking agent particles (II) dispersed separately from particles (I).

The particles (I) and (II) are contained in the dispersion preferably in proportions of 99/1 to 50/50, more preferably 97/3 to 60/40, still more preferably 95/5 to 70/30, most preferably 93/7 to 80/20.

The thermocrosslinkable resin dispersion of the invention contains the particles (I) and particles (II) preferably at a total concentration of 5 to 60%, more preferably 10 to 50%, most preferably 20 to 40%.

The particles (I) preferably have a particle diameter (number average particle diameter: measured by a model LA-920 particle size distribution measuring apparatus (HORIBA Ltd.)) of 0.01 to 100 μm, more preferably 0.05 to 50 μm, most preferably 0.1 to 30 μm. The particles (II) preferably have a particle diameter (number average particle diameter) of 0.01 to 100 μm, more preferably 0.05 to 50 μm, most preferably 0.1 to 30 μm.

The aqueous dispersion comprising a dispersed phase composed of such separately dispersed particles (I) and particles (II) is constituted from an aqueous dispersion (A) of the resin component [(a) or (a) and (b)], a crosslinking agent (c) and an aqueous dispersion (B) as essential constituents.

[Aqueous Dispersion (A)]

The dispersion (A) is formed by dispersing the resin component [(a) or (a) and (b)] or, where necessary, a mixture thereof with an organic solvent in the aqueous medium.

When (b) is used in combination, it is necessary to mix up (a) and (b) beforehand prior to forming the aqueous dispersion.

The method of mixing is not particularly restricted so long as a substantially uniform resin composition can be obtained. Thus, it may comprise melt mixing or solution mixing. For example, there may be mentioned the method comprising melting and mixing up (a) and (b) in an extruder and the method comprising mixing (a) and (b) in the form of a solution of either one or both in a solvent.

Examples of the solvent to be used in the step of mixing include those HC type solvents mentioned below and the hydrophilic organic solvents mentioned above. The solvent may be the same as or different from the solvent to be used in forming the dispersion (A) or the solvent constituting the continuous phase (aqueous medium) of the resin dispersion.

HC type solvents (C6–24 or higher):

Aromatic HCs, for example benzene, toluene, xylene, ethylbenzene, triethylbenzene, amylbenzene, diamylbenzene, amyltoluene, diphenylethane and tetralin; aliphatic HCs, for example hexane, heptane, octane and decane; and alicyclic HCs, for example cyclohexane, cyclohexene, methylcyclohexane and decalin.

Preferred among these are aromatic HCs, in particular toluene and xylene.

The solvent is used in an amount sufficient for the concentration of (a) and/or (b) in the solution to amount preferably to 50 to 100%, more preferably to 70 to 100%, most preferably to 90 to 99%.

The mixing may be carried out at room temperature or with heating (e.g. at 30 to 130° C. or above, preferably 80 to 130° C.).

The solvent used in the step of mixing may remain in the resin mixture or in the aqueous dispersion formed or may be distilled off after mixing or after formation of the aqueous dispersion. Preferably, it is distilled off after formation of the aqueous dispersion.

The resin component [(a) or (a) and (b)] can be dispersed in the aqueous medium in the conventional manner. For example, there may be mentioned the method comprising mixing a solution of the resin component in a solvent with water with stirring to effect dispersion in water, if necessary followed by removal of the solvent with heating under reduced pressure, and the method comprising mixing the resin component melted by heating at not lower than the melting point thereof with water with stirring without using any solvent to effect dispersion in water.

Examples of the solvent to be used in the step of dispersing include the above-mentioned HCs and hydrophilic organic solvents. The solvent may be the same as or different from the solvent in the aqueous medium. Preferred from the viewpoint of the storage stability of the aqueous dispersion and of the gasohol resistance of coat film is one or more organic solvents selected from among alcohols, esters, amides, and in particular cellosolves and ketones. The solvent is used in an amount sufficient for the concentration of the resin component in the solution to amount preferably to 40 to 99%, more preferably to 50 to 95%, most preferably to 60 to 90%.

The mixing for dispersion of the resin component solution and water can be carried out, for example, by adding the solution to water and stirring the mixture in an agitator (e.g. disperser). The solvent can be distilled off, for example at a temperature of 40 to 100° C. or higher, preferably 60 to 95° C., at 50 to 1,013 hPa, preferably at a reduced pressure of 30 to 800 hPa.

The melting by heating of the resin component without using any solvent can be effected at a temperature from the melting point of the resin component to 190° C. or higher.

The resin component can be dispersed in the aqueous medium using a dispersing agent or using a self-emulsifiable resin as at least part of the resin component, or by using a combination of both.

Examples of the dispersing agent include emulsifiers such as surfactants, dispersants such as water-soluble polymers, and combinations of two or more of these.

The surfactants include nonionic, cationic, anionic and amphoteric surfactants such as those enumerated below and those described in U.S. Pat. Nos. 3,929,678 and 4,331,447.

1) Nonionic Surfactants:

AO-addition product nonionics, for example (poly)oxyalkylene derivatives of active hydrogen atom-containing compounds having a hydrophobic group (C8–24 or higher) [saturated and unsaturated, higher alcohols (C8–18), higher aliphatic amines (C8–24), higher fatty acids (C8–24), etc.; for example alkyl or alkenyl (dodecyl, stearyl, oleyl, etc.) alcohols and amines, and alkanoic or alkenoic acids (lauric, stearic and oleic acid, etc.)] [AO (C2–4, e.g. EO, PO, BO and combinations of two or more of these, in particular EO) (1 to 500 moles or a higher number of moles) adducts (molecular weight 174 to Mn 30,000) and higher fatty acid mono- and diesters of PAGs (e.g. PEG; molecular weight 150 to Mn 6,000)]; (poly)oxyalkylene derivatives of higher fatty acid (as mentioned above) esters of polyhydric alcohols [as described above referring to (m21), e.g. GR, PE and sorbitan] (as mentioned above; molecular weight 320 to Mn 30,000; e.g. Tween type nonionics); (poly)oxyalkylene derivatives of higher fatty acid (as described above) (alkanol)amides (as mentioned above; molecular weight 330 to Mn 30,000); (poly)oxyalkylene derivatives of polyhydric alcohol (as mentioned above) alkyl (C3–60) ethers (as mentioned above; molecular weight 180 to Mn 30,000); and polyoxyethylene derivatives of polyoxypropylene polyols [polyoxypropylene derivatives of polyhydric alcohols (as mentioned above) and of polyamines (the above-mentioned PAs) (e.g. PPG and ethylenediamine-PO adducts; Mn 500 to 5,000)] (Mn 1,000 to 30,000) [Pluronic type and Tetronic type nonionics];

Polyhydric alcohol (C3–60) type nonionics, for example fatty acid (as mentioned above) esters of polyhydric alcohols (as mentioned above), polyhydric alcohol (as mentioned above) alkyl (C3–60) ethers, and fatty acid (as mentioned above) alkanolamides; and Amine oxide type nonionics, for example (hydroxyl)alkyl (C10–18: e.g. dodecyl, stearyl, oleyl, 2-hydroxydodecyl)di (hydroxyl)alkyl(C1–3: e.g. methyl, ethyl, 2-hydroxyethyl) amine oxides.

2) Cationic Surfactants:

Quaternary ammonium salt type cationics, for example tetraalkylammonium salts (C11–100), e.g. alkyl(C8–18: e.g. lauryl, stearyl)trimethylammonium salts and dialkyl(C8–18: e.g. decyl, octyl)dimethylammonium salts; trialkylbenzylammonium salts (C17–80), e.g. lauryldimethylbenzylammonium salts; alkyl(C8–60)pyridinium salts, e.g. cetylpiridinium salts; (poly)oxyalkylene(C2–4, polymerization degree 1 to 100 or higher)trialkylammonium salts (C12–100), e.g. polyoxyethylenelauryldimethylammonium salts; and acyl(C8–18)aminoalkyl(C2–4) to or acyl(C8–18) oxyalkyl(C2–4)tri[(hydroxyl)alkyl(C1–4)]ammonium salts, e.g. stearamidoethyldiethylmethylammonium salts (Sapamine type quaternary ammonium salts) [the salts mentioned above including, for example halides (chloride, bromide, etc.), alkyl sulfates (methosulfate, etc.) and salts with organic acids (such as mentioned below)]; and Amine salt type cationics: salts of primary to tertiary amines [e.g. higher aliphatic amines (C12–60: lauryl-, stearyl- and cetylamine, hardened tallow amine, rosin amine, etc.), polyoxyalkylene derivatives (as mentioned above: e.g. EO adducts) of aliphatic amines (as mentioned above), and acylaminoalkyl- or acyloxyalkyl(as mentioned above)di(hydroxyl)alkyl(as mentioned above)amines (stearoyloxyethyldihydroxyethylamine, stearamidoethyldiethylamine, etc.)] with inorganic acids (hydrochloric acid, sulfuric acid, nitric acid, phosphoric acid, etc.) and organic acids (C2–22: acetic, propionic, lauric, oleic, succinic, adipic and azelaic acid, benzoic acid, etc.).

3) Anionic Surfactants:

Carboxylic acids (salts), for example higher fatty acids (as mentioned above), ethercarboxylic acids [carboxymethylation products derived from higher alcohol (as mentioned above) or AO adducts thereof, for example EO (1 to 10 moles) adducts], and salts thereof; sulfate ester salts, for example sulfate ester salts of the above-mentioned higher alcohols or AO adducts thereof (alkyl and alkyl ether sulfates, sulfated oils (salts obtained by sulfation of natural unsaturated fats/oils or unsaturated waxes as such, followed by neutralization), sulfated fatty acid esters (salts obtained by sulfation of unsaturated fatty acid lower alcohol esters, followed by neutralization) and sulfated olefins (salts obtained by sulfation of C12–18 olefins, followed by neutralization); sulfonic acid salts, for example alkylbenzenesulfonic acid salts, alkylnaphthalenesulfonic acid salts, dialkyl sulfosuccinate type ones, α-olefin(C12–18)sulfonic acid salts and N-acyl-N-methyltaurines (Igepon T type ones, etc.); and phosphate ester salts, for example phosphate ester salts of the above-mentioned higher alcohols or AO-adducts thereof or of alkyl(C4–60)phenol-AO adducts (as mentioned above) (alkyl, alkyl ether and alkylphenyl ether phosphates).

4) Amphoteric Surfactants:

Carboxylic acid (salt) type amphoterics, for example amino acid type amphoterics, e.g. alkyl(C8–18)aminopropionic acids (salts), and betaine type amphoterics, e.g. alkyl(as mentioned above)di(hydroxyl)alkyl(as mentioned above)betaines (alkyldimethylbetaines, alkyldihydroxyethylbetaines, etc.); sulfate ester (salt) type amphoterics, for example alkyl(as mentioned above)amine sulfate esters (salts), and hydroxyalkyl(C2–4: e.g. hydroxyethyl)imidazoline sulfate esters (salts); sulfonic acid (salt) type amphoterics, for example alkyl(as mentioned above: e.g. pentadecyl)sulfotaurines, and imidazolinesulfonic acid (salts); and phosphate ester (salt) type amphoterics, for example glycerol higher fatty acid (as mentioned above) ester phosphate esters (salts).

The salt moieties in the above-mentioned anionic and amphoteric surfactants include metal salts, for example alkali metal (e.g. lithium, sodium, potassium), alkaline earth metal (e.g. calcium, magnesium) and group IIB metal (e.g. zinc) salts; ammonium salts; and amine salts and quaternary ammonium salts.

Examples of the salt-forming amine include C1–20 amines, for example such hydroxylamines, tertiary amino group-containing diols and primary monoamines as described hereinabove referring to (m21), such secondary monoamines as described hereinabove referring to (m3), and alkylation (C1–4) and/or hydroxyalkylation (C2–4) products (AO adducts): for example, mono-, di- and tri(hydroxyl) alkyl(amines) (mono-, di- and triethanolamine and ethylamine, diethylethanolamine, morpholine, N-methylmorpholine, N-hydroxyethylmorpholine, etc.). The quaternary ammonium salts include quaternization products derived from these amines [products of quaternization with quaternizing agents described in U.S. Pat. No. 4,271,217 or dialkyl carbonates (as mentioned above)].

The dispersants include those mentioned later herein under (C2).

The dispersing agent is used generally in an amount of not more than 80%, preferably not more than 40%, more preferably not more than 20%, still more preferably not more than 10%, most preferably not more than 5%, but preferably not less than 0.1%, more preferably not less than 0.2%, based on the weight of the resin component. The dispersing agent may be added in advance to the resin component (or a solution thereof) or to the aqueous medium or at the time of dispersion by mixing. The addition to the aqueous medium is preferred, however.

Examples of the self-emulsifiable resin include modified polyolefin resins (ae) having self-emulsifying properties and vinyl resins (be) having self-emulsifying properties.

The resins (ae) include the following 1) to 3):

1) Salts of the resins (a1) as resulting from (partial) neutralization thereof (conversion of at least part of the carboxyl groups to salt form).

The salts include the same ones as mentioned hereinabove referring to the anionic and amphoteric surfactants (alkali metal salts etc.). The degree of neutralization of the (partial) neutralization salts is generally 0.1% to 90% or higher, preferably 1% to 60%, more preferably 5% to 40%.

2) Those which have one or more hydrophilic polymer moieties among the resins (a12) and (a2).

These polymers have an HLB of at least 6 and are selected, for example, from the group consisting of PTs, PSs, PDs and PUs, either singly or in combination of two or more.

3) Those which have one or more ionic groups (other than those mentioned above) among the resins (a2).

The ionic groups include cationic groups, for example quaternary ammonium bases and amine bases; and anionic groups, for example sulfate ester (salt) groups and sulfo groups [sulfonic acid (salt) groups]. The salts of the anionic groups include the same ones as mentioned above under 1). The salts of the quaternary ammonium bases and amine bases include the same quaternary ammonium salts and inorganic or organic acid salts as mentioned above referring to the cationic surfactants.

Examples of the method of ionic group introduction include, for example, the method comprising modifying (a1) using, as at least part of the modifying agent, an ionic group (quaternary ammonium base, amine base or sulfo group)-containing one [e.g. a quaternary ammonium base-containing polyol, tertiary amino group-containing polyol salt, sulfo group-containing polycarboxylic acid, or a derivative (e.g. AO adduct, esterification product) thereof; the method comprising modifying (a1) using, as at least part of the modifying agent, a precursor thereof [modifying agent having a group(s) or atom(s) capable of being converted to the above-mentioned ionic group(s): for example a tertiary amino group-containing polyol, halogen atom- or epoxy group-containing modifying agent (e.g. epihalohydrin, epoxy alcohol) or hydroxyl group-containing modifying agent (e.g. hydroxylamine, polyol)] for tertiary amino, halogen atom or epoxy or hydroxyl group introduction and then neutralizing or quaternizing the amino group(s) or converting the halogen atom(s) or epoxy group(s) to a quaternary ammonium group(s) or sulfating the hydroxyl group(s) by reaction with a sulfonating agent; and the method comprising sulfo-modifying (a1). The neutralization and quaternization of tertiary amino groups can be carried out using the above-mentioned inorganic or organic acids and quaternizing agents. The quaternization of the halogen atoms introduced can be accomplished by reacting with tertiary amines (e.g. those mentioned hereinabove referring to the anionic and amphoteric surfactants), and the quaternization of epoxy groups by reacting with tertiary amines (as mentioned above) in the presence of an inorganic or organic acid (as mentioned above). Examples of the sulfonating agent include (fuming) sulfuric acid, sulfuric anhydride and chlorosulfonic acid. The sulfo-modification of (a1) can be carried out, for example, in the manner of esterification with a hydroxyalkanesulfonic acid (C2–4: e.g. hydroxyethanesulfonic acid) or ring opening addition of an alkanesultone (C3–4: e.g. propane- and butanesultone).

From the viewpoint of the film-forming ability of the aqueous resin dispersion in the step of application thereof to substrates, of the gasohol resistance of coat film and of the water resistance and adhesion to substrates, the ionic group-containing resins (a) preferably have an ionic group content of 0.1% to 20%, more preferably 1% to 10%.

The resins (be) include (co)polymers of an ionic group (as mentioned above or phosphoric or phosphonic acid group)-containing monomer or monomers [e.g. (b3), (b452), (b5)] and copolymers thereof with another monomer [e.g. (b1), (b2), (b4)]. These (co)polymers can be produced by (co)polymerizing the monomers mentioned above or by (co)polymerizing precursors thereof, followed by conversion to the corresponding ionic groups. From the viewpoint of the film-forming ability of the aqueous resin dispersion in the step of application thereof to substrates, of the gasohol resistance of coat film and of the water resistance and adhesion to substrates, the resins (be) preferably have an ionic group content of 0.1% to 20%, more preferably 1% to 10%.

[Aqueous Dispersion (B)]

The dispersion (B) is formed by dispersing (c) in an aqueous medium.

It can be prepared in the same manner as in the case of (A). Thus, the conventional methods may be mentioned, for example, the method comprising adding a solution of (c) in a solvent (e.g. toluene) or (c) melted by heating to water containing a dispersing agent (e.g. such an emulsifier as mentioned above) and causing emulsification/dispersion with stirring, if necessary followed by distilling off the solvent by heating under reduced pressure. The dispersing agent is used in an amount of 0.1 to 10%, for instance, based on the weight of (c). The emulsification/dispersion can be accomplished by stirring with an agitator (e.g. disperser). The removal of the solvent by distillation can be accomplished under the same conditions as in the case of (A).

The aqueous dispersion (B) generally contains (c) at a concentration of 5 to 60%, preferably 10 to 60%, more preferably 10 to 30%.

[Aqueous Thermocrosslinkable Resin Dispersion]

The aqueous thermocrosslinkable resin dispersion of the invention which contains the particles (I) and the particles (II) dispersed separately from (I) can be produced by mixing up the above-mentioned dispersions (A) and (B).

(A) and (B) are mixed together in such a resin component/crosslinking agent ratio that the resin component [(a) or (a) and (b)] and crosslinking agent (c) give the above-mentioned particles (I)/(II) ratio.

The aqueous dispersion of the invention may contain, in addition to the aqueous medium and particles (I) and (II), an organic solvent and one or more of other additives (C), according to need.

Employable as the organic solvent are one or more species selected from the group consisting of HCs, alcohols, ethers, ketones, esters and amides. Specific examples thereof include those already mentioned hereinabove.

The organic solvent is used preferably in an amount of 1 to 60%, more preferably 1 to 50%, still more preferably S to 50%, most preferably 10 to 40%, based on the weight of the resin component.

The additives (C) include the following.

Colorants (C1):

Inorganic pigment, for example white pigments (e.g. titanium oxide, lithopone, white lead, zinc white), cobalt compounds (e.g. aureolin, cobalt green, cerulean blue, cobalt blue, cobalt violet), iron compounds (e.g. iron oxide, Prussian blue), chromium compounds (e.g. chromium oxide, lead chromate, barium chromate, and sulfides (e.g. cadmium sulfide, cadmium yellow, ultramarine);

Organic pigments, for example azo pigments (e.g. azo lake, monoazo, disazo and chelate azo pigments), and polycyclic pigments (e.g. benzimidazolone, phthalocyanine, quinacridone, dioxane, isoindolinone, thioindigo, perylene, quinophthalone and anthraquinone pigments); and Dyes, for example azo, anthraquinone, indigoid, sulfur, triphenylmethane, pyrazolone, stilbene, diphenylmethane, xanthene, alizarin, acridine, quinoneimine, thiazole, methine, nitro, nitroso and aniline dyes.

Dispersant (C2):

Water-soluble polymers (Mn: 1,000 to 100,000 or higher, preferably 3,000 to 10,000; solubility in water: at least 1 g/100 g, preferably at least 10 g/100 g): nonionic water-soluble polymers, for example polyvinyl alcohol, polyacrylamide and poly-EO; and anionic water-soluble polymers, for example naphthalenesulfonic acid-formaldehyde condensates (Mn 1,000 to 10,000); (co)polymers of a sulfo group-containing monomer [(b452) mentioned above] or/and a carboxyl group-containing monomer [(b3) mentioned above] with or without another monomer [e.g. (b1), (b2) or (b4) mentioned above], for example polystyrenesulfonic acid salts (Mn 1,000 to 100,000), poly(meth)acrylic acid salts (Mn 2,000 to 50,000), (meth)acrylic acid (salt)/ alkyl (meth)acrylate copolymers and maleic acid (salt)/vinyl acetate copolymers; and cellulose derivatives, for example carboxymethylcellulose. The salts of anionic polymers include the same ones [alkali metal (e.g. sodium, potassium) salts etc.] as mentioned hereinabove referring to the anionic and amphoteric surfactants.

Catalyst (C3):

Catalysts and cocatalysts (promoters enhancing the activity of catalysts or crosslinking agents) promoting the reaction of the functional groups in (a) (carboxyl, hydroxyl, mercapto, amino, isocyanate and carbodiimide) and the reactive groups in (c) (hydroxyl, amino, epoxy and carbodiimide): catalysts for the reactions of carboxyl groups [e.g. (thio)esterification], for example acidic catalysts (sulfuric acid, hydrochloric acid, sulfonic acids, aluminum chloride, etc.), basic catalysts (sodium acetate, calcium oxide, tertiary amines, etc.) and metal catalysts (dibutyltin oxide, tetrabutyl titanate, etc.); catalysts for the reactions of isocyanate or carbodiimide groups, for example amine catalysts [tertiary amines, e.g. triethylenediamine and 1,8-diazabicyclo[5.4.0]undecene-7 (DBU): San-Apro, registered trade mark]] and organometallic (tin, lead, etc.) catalysts (stannous octoate, dibutyltin dilaurate, lead octenoate, etc.): and catalysts or curing promoters for the reaction of epoxy groups, for example those phosphorus compounds (phosphines etc.), imidazoles and tertiary amines (DBU etc.) which are described in the specification of U.S. Pat. No. 5,162,437.

Fillers (C4):

Powdery, granular, amorphous, hollow particle-shaped, fibrous and whisker-shaped inorganic and organic reinforcing agents and extenders, for example calcium carbonate, talc, clay, silicic acid, silicates, asbestos, mica, minute hollow spheres (e.g. glass balloons, phenol resin balloons), reinforcing fibers (e.g. glass fiber, carbon fiber, metal fibers), and whiskers (e.g. ceramic whiskers, titanium whiskers).

Flatting Agents (C5):

Those enumerated under (C4) as well as plastics fine particles, for example fine particles of polyolefin such as polyethylene and/or polypropylene.

Flame Retardants (C6):

Phosphorus-containing flame retardants, for example phosphates, phosphonates and phosphites [e.g. tricresyl phosphate, tris(2,3-dibromopropyl) phosphate, dimethyl methanephosphonate, polymeric phosphites, ammonium polyphosphate], and red phosphorus; halogen-containing flame retardants, for example bromine-containing flame retardants (organobromine compounds, e.g. decabromobiphenyl ether and tetrabromobisphenol A), and chlorine-containing flame retardants (e.g. HET acid); metal (hydr)oxides, for example antimony trioxide, magnesium hydroxide and aluminum hydroxide; and borate salt flame retardants, for example zinc borate and barium metaborate.

Stabilizers (C7):

Antioxidants (C71):

Phenolic ones (hindered phenols), for example 2,6-di-tert-butyl-p-cresol (BHT) and 2,2'-methylenebis(4-methyl-6-tert-butylphenol); sulfur-containing ones, for example dilauryl-3,3'-thiodipropionate (DLTDP) and distearyl-3,3'-thiodipropionate (DSTDP); phosphorus-containing ones (organic phosphites which may contain halogen atoms), for example triphenyl phosphite (TPP), triisodecyl phosphite (TDP), and halogen-substituted derivatives thereof; and amine type ones (hindered aromatic amines), for example octyldiphenylamine, N-n-butyl-p-aminophenol and N,N-diisopropyl-p-phenylenediamine.

Ultraviolet Absorbers (C72):

Benzophenones, for example 2-hydroxybenzophenone and 2,4-dihydroxybenzophenone; salicylates, for example phenyl salicylate and 2,4-di-tert-butylphenyl-3,5-di-tert-butyl-4-hydroxybenzoate; benzotriazoles, for example (2'-hydroxyphenyl)benzotriazole and (2'-hydroxy-5'-methylphenyl)benzotriazole; and acrylics, for example ethyl-2-cyano-3,3'-diphenylacrylate and methyl-2-carbomethoxy-3-(paramethoxybenzyl) acrylate.

Hydrolysis Inhibitors (C73):

For example carbodiimides (e.g. Stabaxol 1, PCD), 4-tert-butylcatechol, azodicarbonamide, azodicarboxylic acid esters and fatty acid amides.

The levels of addition of these additives can be varied in a wide range according to the purposes and the performance characteristics required so long as the characteristics of the aqueous dispersion will not be deteriorated. Generally, however, they are used in the following ranges based on the total weight of the resin component [(a)+(b)] and crosslinking agent (c).

(C1): generally 5% or below, preferably 0.1 to 2%;
(C2): generally 10% or below, preferably 0.2 to 5%;
(C3): generally 5% or below, preferably 0.01 to 0.5%;
(C4): generally 50% or below, preferably 5 to 30%;
(C5): generally 10% or below, preferably 0.5 to 5%;
(C6): generally 30% or below, preferably 5 to 25%;
(C71): generally 5% or below, preferably 0.05 to 1%;
(C72): generally 5% or below, preferably 0.05 to 1%;
(C73) : generally 5% or below, preferably 0.05 to 1%;
(C7) in total: generally 5% or below, preferably 0.05 to 1%;
(C) in total: generally 50% or below, preferably 10 to 30%.

The addition of (C) can be made at any arbitrary step in the process of aqueous dispersion formation. For example, there may be mentioned, for example, 1) the method comprising admixing (C) with (a) or (b) or both in advance, 2) the method comprising adding (C) in the step of mixing (a) with (b) or mixing (a), (b) and the organic solvent together, 3) the method comprising adding (C) in the step of making (a) into an aqueous dispersion for forming (A), 4) the method comprising adding (C) to (c) in advance, 5) the method comprising adding (C) in the step of making (c) into an aqueous dispersion for forming (B), and 6) the method comprising adding (C) in the step of mixing (A) with (B). Among these, the method 1) and, in particular, the method 2) are preferred from the viewpoint of the stability of the aqueous dispersion and the effects of the additives and from the viewpoint that the additives should not be thermally affected.

The aqueous thermocrosslinkable resin dispersion of the invention can be widely applied, for example as a coating composition such as a primer or paint composition, or as an adhesive composition, to various substrates or articles to be coated.

The substrates to which the dispersion can be applied include various inorganic substrates, for example metals (iron, tin-plated steel sheets, zinc-plated steel sheets, aluminum, etc.), glass, tiles/slates and ceramics; organic materials, for example wood, paper, cloths (woven fabrics and nonwoven fabrics made of natural fibers, chemical fibers and synthetic fibers, etc.), rubbers [natural and synthetic rubbers (e.g. chloroprene, isoprene and neoprene rubbers)], and plastics [e.g. polyolefin resins (polyethylene, polypropylene, ethylene-propylene copolymers, propylene-α-olefin copolymers, etc.), polystyrene, ABS, polyvinyl chloride, polycarbonates, polyacetals, polyesters, PDs, PUs, modified polyphenylene oxides (PPOs), polymethyl methacrylate, epoxy resins, phenol resins and melamine resins; and composite materials composed of these. Preferred are polyolefin resin-made plastics substrates.

The aqueous thermocrosslinkable resin dispersion of the invention is widely used as a halogen-free primer for the surface treatment of polyolefin resin-made plastics substrates, in particular polypropylene moldings.

The method of application of the aqueous thermocrosslinkable resin dispersion of the invention is not particularly restricted but the same methods as in applying ordinary primers, paints and adhesives can be employed.

The method of applying a primer comprising the aqueous dispersion of the invention to substrates and further applying a topcoat film composition thereon is not particularly restricted; for example, one or more topcoating composition (or an intermediate coat composition and a topcoating composition) can be applied to the surface of the coat layer of the dispersion after drying, either by the wet-on-wet technique or after baking (curing) (if necessary, further baking is carried out). It is preferred that the topcoating composition is applied to the primer surface after drying and then baking is carried out. Prior to primer application, the substrates are preferably washed and/or pretreated (e.g. by corona discharge treatment) so that the smoothness and adhesion of the coat film may be improved. The washing can be accomplished using, for example, water and/or an organic solvent (e.g. toluene, methyl ethyl ketone and/or isopropyl alcohol). It is also possible to do ultrasonic washing.

As for the method of applying the aqueous thermocrosslinkable resin dispersion of the invention and a topcoating composition, there may be mentioned, for example, spray coating, brush coating, trowel coating, roll coating, curtain flow coating and dipping. From the viewpoint of coating speed and coat surface smoothness, spray coating is preferred.

The topcoating composition is not particularly restricted but there may be mentioned acrylic, urethane, polyester and epoxy coating compositions. These may be of the noncuring type (lacquers etc.) or of the curing type (isocyanate curing, epoxy curing, acid-epoxy curing, melamine curing, etc.). From the appearance and damage resistance viewpoint, curing type ones, in particular acrylic paint compositions of the isocyanate curing type, are preferred.

Examples of the topcoating composition include, for example, 1) the type such that the coating composition contains a pigment and the like and is applied to form one single layer alone, 2) the type such that a pigment-free clear coating composition is applied to form one single layer alone, and 3) the type such that a pigment-containing undercoating (base coating) composition is applied and then a pigment-free clear coating composition is applied onto the basecoat in the wet-on-wet manner. Among these, the method 3) is preferred from the appearance and durability viewpoint.

Although the thickness of the coat films (dry film thickness; hereinafter the same shall apply) formed from the aqueous dispersion of the invention may be varied arbitrarily, it is generally 1 to 200 µm, preferably 3 to 100 µm, more preferably 5 to 50 µm. The thickness of the coat films formed from the topcoating composition is generally 5 to 200 µm, preferably 10 to 100 µm, more preferably 15 to 50 µm.

The drying after application the aqueous dispersion of the invention and the baking (fixation) after topcoating composition application can be carried out at room temperature or under heating. The conditions of heating/drying of the aqueous dispersion of the invention are not particularly restricted but, for example, the heating/drying is carried out at 40 to 270° C. for 10 seconds to 120 minutes. From the drying rate and substrate deformation viewpoint, it is preferably carried out at 60 to 180° C. for 5 to 60 minutes, in particular at 80 to 120° C. for 10 to 30 minutes.

As for the conditions of baking (fixation) after topcoating composition application, the baking is generally carried out at 40 to 270° C. for 10 seconds to 120 minutes, preferably from the baking speed and substrate deformation viewpoint, at 60 to 180° C. for 5 to 60 minutes, more preferably at 70 to 150° C. for 7 to 40 minutes, most preferably at 80 to 120° C. for 10 to 30 minutes.

The coated articles as coated with the aqueous dispersion of the invention for basecoat formation and further with a topcoating composition are widely used in various fields of industry (e.g. in the fields of automobiles, building materials, home interior materials, electrical appliances and packaging materials), in particular as interior and exterior materials in the automobile field (e.g. bumpers, instrument panels, center consoles, switch panels).

BEST MODE FOR CARRYING OUT THE INVENTION

The following examples are further illustrative of the present invention. They are, however, by no means limitative of the scope of the invention.

In the following, the polyolefin (a01) subjected to MA modification was a low-molecular-weight polyolefin with a Mn of 4,500 as obtained by thermal degradation (carried out at 360° C. at ordinary pressure in a nitrogen gas stream for 80 minutes) of a commercially available high-molecular-weight polyolefin resin (propylene-α-olefin copolymer, Tafmer XR 107L, product of Mitsui Chemicals Inc.); (a02) was a low-molecular-weight polyolefin with a Mn of 4,500 as obtained by thermal degradation (carried out at 360° C. at ordinary pressure in a nitrogen gas stream for 70 minutes) of a commercially available high-molecular-weight polyolefin resin (polypropylene, Noblen H 501, product of Sumitomo Chemical Co., Ltd.). The performance evaluations were performed by the following test methods.

(1) Film-forming Ability Testing

A test plate (polypropylene-made standard plate: 150× 70×2 mm) is spray-coated with the aqueous dispersion to be tested using a sprayer (model EBG-115EXB, product of Anest Iwata Corporation), followed by 10 minutes of drying at 80° C. (dry film thickness: about 10 µm). The appearance of the coat film is observed by the eye and evaluated according to the following criteria:

Excellent: Satisfactory film formation, no unevenness is observed;
Good: Filmy, though there is a slight degree of unevenness;
Fair: Although resin particles in the aqueous dispersion are in a fused state but are not forming a film;
Poor: Resin particles in the aqueous dispersion remain as such and are adhering to the substrate.

(2) Adhesion Testing

The coated plate obtained as described above under (1) is further coated with a topcoating composition, and the composite film on the resulting coated plate is subjected to adhesion testing by the cross cut tape method according to JIS K 5400. The number of those squares out of 100 grid squares which remain unpeeled is reported in terms of the number 0 to 100.

(3) Gasohol Resistance Testing

A coated plate prepared by applying a topcoating composition in the same manner as described above under (2) is immersed in a mixed solvent composed of 90 parts of regular gasoline and 10 parts of ethyl alcohol at room temperature (25° C.) for 1 hour and, then, the appearance of the coat film is observed.

PRODUCTION EXAMPLE 1

A three-necked flask equipped with a condenser was charged with 95 parts of (a01), 5 parts of MA and 100 parts of xylene and, after nitrogen substitution, the contents were heated to 130° C. in a stream of nitrogen for attaining uniform dissolution. Thereto was added dropwise a solution of 0.5 part of CPO in 10 parts of xylene. Thereafter, the mixture was heated at the refluxing temperature of xylene with stirring for 3 hours. The xylene was then distilled off under reduced pressure to give a MA-modified polyolefin (a1–1) with a Mn of 5,000.

PRODUCTION EXAMPLE 2

A MA-modified polyolefin (a1–2) with a Mn of 5,000 was obtained in the same manner as in Production Example 1 except that (a02) was used in lieu of (a01).

PRODUCTION EXAMPLE 3

A three-necked flask equipped with a condenser was charged with 100 parts of a monomer mixture composed of DM/BA/AA (mixing ratio 70/25/5) and 100 parts of xylene and, after nitrogen substitution, the contents were heated to 155° C. in a tightly closed condition. A solution of 1 part of CPO in 10 parts of xylene was added dropwise over 2 hours, followed by further 2 hours of stirring. The xylene was then distilled off under reduced pressure to give an acrylic resin (b-1) with a Mn of 5,000 and a Tg of –45° C.

COMPARATIVE PRODUCTION EXAMPLE 1

An acrylic resin (b-2) with a Mn of 50,000 and a Tg of –45° C. was obtained in the same manner as in Production Example 3 except that the reaction was carried out at a temperature of 140° C. using 0.4 part of CPO.

COMPARATIVE PRODUCTION EXAMPLE 2

An acrylic resin (b-3) with a Mn of 5,000 and a Tg of 65° C. was obtained in the same manner as in Production Example 3 except that the monomer mixture used was composed of methyl methacrylate/BA/methacrylic acid (mixing ratio 70/25/5).

PRODUCTION EXAMPLES 4 TO 6 AND COMPARATIVE PRODUCTION EXAMPLES 3 TO 4

A three-necked flask was charged with a modified polyolefin and an acrylic resin each specified in Table 1. The contents were dissolved by heating to 80° C. and mixed up uniformly. The mixture obtained was added dropwise to 300 parts of a 0.4% aqueous solution of sodium hydroxide and dispersed therein while maintaining the temperature at 90° C. In this manner, aqueous dispersions (A-1) to (A-5) with a solid content of 25% were obtained.

COMPARATIVE PRODUCTION EXAMPLE 5

An aqueous dispersion (A-6) with a solid content of 25% was obtained in the same manner as in Production Example 4 except that (a1–1) and (b-1) were separately heated to 110° C. and separately added dropwise to 300 parts of a 0.4% aqueous solution of sodium hydroxide so that the solid matter weight ratio might amount to 80/20.

COMPARATIVE PRODUCTION EXAMPLE 6

A three-necked flask equipped with a condenser was charged with 95 parts of (a01), 5 parts of MA and 100 parts of xylene and, after nitrogen substitution, the contents were heated to 130° C. in a stream of nitrogen for attaining uniform dissolution. Thereto was added dropwise a solution of 0.5 part of CPO in 10 parts of xylene. Thereafter, the mixture was heated at the refluxing temperature of xylene with stirring for 3 hours. Then, a mixture of 20 parts of a monomer mixture composed of DM/BA/AA (mole ratio 70/25/5) and 30 parts of xylene, and a solution of 1 part of CPO in 10 parts of xylene were separately added dropwise under pressure over 3 hours, and the resulting mixture was further stirred for 2 hours and then cooled to 90° C.

The resin solution obtained was added dropwise to 500 parts of a 0.4% aqueous solution of sodium hydroxide for attaining dispersion while maintaining the temperature at 90° C. An aqueous dispersion (A-7) with a solid content of 25% was thus obtained.

EXAMPLES 1 TO 4 AND COMPARATIVE EXAMPLES 1 TO 4

The aqueous dispersions (A-1) to (A-7) were each mixed with a commercially available aqueous epoxy resin dispersion (Japan Epoxy Resins Co., Ltd.'s 880SAW65, hereinafter abbreviated as "EE") or an aqueous carbodiimide dispersion (Nisshinbo Industries Inc.'s Carbodilite E-02, hereinafter abbreviated as "CE") in a mixing ratio specified in Table 2, and each mixture was diluted with water to a solid concentration of 25%. Thermocrosslinkable aqueous dispersions were thus prepared.

A polypropylene-made standard plate (injection-molded plate, 150×70×2 mm) surface, after washing with water and air drying, was sprayed with each thermocrosslinkable aqueous dispersion using a sprayer (Anest Iwata Corporation's model EBG-115EXB sprayer), followed by 10 minutes of drying at 80° C. to give a dry coat film having a film thickness of about 10 μm. The appearance thereof was observed and evaluated for film-forming ability at 80° C.

Thereafter, each coat film was sprayed with a topcoating composition prepared by diluting a commercially available melamine-alkyd type paint (Nippon Bee Chemical Co., Ltd.'s "Flexen #101") with a thinner (Nippon Bee Chemical Co., Ltd.'s "#101-10") in a mixing ratio of 2:1 (paint/thinner ratio) using a sprayer (Anest Iwata Corporation's model EBG-115EXB). After 15 minutes of standing at room temperature, baking was carried out at 80° C. for 20 minutes using a circulating drier (dry film thickness: about 40 μm). Each coat film obtained was subjected to adhesion testing and gasohol resistance testing. The results thus obtained are shown in Table 3.

TABLE 1

| Production Examples and Comparative Production Examples | Composition of aqueous dispersion | | | |
|---|---|---|---|---|
| | Aqueous dispersion (A) | Modified polyolefin (a) | Vinyl resin (b) | (a)/(b)/toluene (ratio by parts) |
| Production Example 4 | A-1 | a1-1 | b-1 | 80/20/0 |
| Production Example 5 | A-2 | a1-2 | b-1 | 80/20/0 |
| Production Example 6 | A-3 | a1-1 | b-1 | 80/20/20 |
| Comparative Production Example 3 | A-4 | a1-1 | b-2 | 80/20/20 |
| Comparative Production Example 4 | A-5 | a1-1 | b-3 | 80/20/20 |

TABLE 2

| Examples and Comparative Examples | Aqueous dispersion (A) | Commercial aqueous dispersion (B) | (A)/(B) (solid matter weight ratio) |
|---|---|---|---|
| Example 1 | A-1 | EE | 95/5 |
| Example 2 | A-2 | EE | 95/5 |
| Example 3 | A-3 | EE | 95/5 |
| Example 4 | A-1 | CE | 95/5 |
| Comparative Example 1 | A-4 | EE | 95/5 |
| Comparative Example 2 | A-5 | EE | 95/5 |
| Comparative Example 3 | A-6 | EE | 95/5 |
| Comparative Example 4 | A-7 | EE | 95/5 |

TABLE 3

| Examples and Comparative Examples | Film-forming ability at 80° C. | Adhesion (Cross cut adhesion test) | Gasohol resistance |
|---|---|---|---|
| Example 1 | Excellent | 100/100 | OK |
| Example 2 | Good | 100/100 | OK |
| Example 3 | Excellent | 100/100 | OK |
| Example 4 | Excellent | 100/100 | OK |
| Comparative Example 1 | Fair | 30/100 | Swelling |
| Comparative Example 2 | Fair | 30/100 | Swelling |
| Comparative Example 3 | Good | 90/100 | Swelling |
| Comparative Example 4 | Fair | 80/100 | Swelling |

INDUSTRIAL APPLICABILITY

The thermocrosslinkable aqueous dispersion of the invention can produce the following effects, hence is very useful.
(1) It shows good film-forming ability even at low temperatures.
(2) It provides sufficient adhesion even upon low-temperature baking.
(3) It provides good adhesion to both a polyolefin resin substrate and a topcoat film.
(4) The coat films obtained therefrom show good water resistance and good resistance to gasoline and chemicals such as alcohols (gasohol resistance).
(5) It makes it possible to obtain polyolefin plastics products free of the possibility of environmental pollution without using halogen-containing resins possible causing environmental pollution.

The invention claimed is:

1. A thermocrosslinkable resin dispersion which comprises
a continuous phase comprising an aqueous medium and a dispersed phase distributed therein;
said dispersed phase comprising particles (I) of a resin component and particles (II) of a crosslinking agent as separately dispersed from the particles (I),
said resin component comprising, as an essential constituent thereof, a polyolefin resin (a) or a mixture thereof with a vinyl resin (b),
said resin (a) having a number average molecular weight of at least 1,500 and being comprised of a polyolefin polymer (a0) having been modified by the addition of at least one functional group species selected from the group consisting of carboxyl, hydroxyl, mercapto, amino, isocyanato and carbodiimido groups,
said resin (b) having a number average molecular weight of 700 to 40,000 and a glass transition temperature of −65 to 40° C., and
said crosslinking agent having at least two groups reactive with said resin (a);
wherein the crosslinking agent has at least two reactive groups selected from the group consisting of hydroxyl, amino, epoxy and carbodiimido groups.

2. The dispersion according to claim 1, said polyolefin polymer (a0) having a number average molecular weight of 1,500 to 40,000.

3. A thermocrosslinkable resin dispersion which comprises
a continuous phase comprising an aqueous medium and a dispersed phase distributed therein;
said dispersed phase comprising particles (I) of a resin component and particles (II) of a crosslinking agent as separately dispersed from the particles (I),
said resin component comprising, as an essential constituent thereof, a polyolefin resin (a) or a mixture thereof with a vinyl resin (b),
said resin (a) having a number average molecular weight of at least 1,500 and being comprised of a polyolefin polymer (a0) having been modified by the addition of at least one functional group species selected from the group consisting of carboxyl, hydroxyl, mercapto, amino, isocyanato and carbodiimido groups,
said resin (b) having a number average molecular weight of 700 to 40,000 and a glass transition temperature of −65 to 40° C., and
said crosslinking agent having at least two groups reactive with said resin (a);
wherein the crosslinking agent has at least two reactive groups selected from the group consisting of hydroxyl, amino, epoxy and carbodiimido groups;
said polyolefin polymer (a0) having a number average molecular weight of 1,500 to 40,000;
wherein the polymer (a0) is a polyolefin thermally degraded to an equivalent degree as if it were heated in an inert gas at between 300 to 450° C. for 0.5 to 10 hours.

4. The dispersion according to claim 1, wherein the resin (a) is a carboxy-modified polyolefin resin (a1) comprised of said polyolefin polymer (a0) having been previously modified by the addition of at least one carboxyl functional group.

5. The dispersion according to claim 4, wherein the resin (a) is a polyolefin resin modification (a2) comprising said carboxy-modified polyolefin resin (a1) having been further reacted with one or more modifying agents other than a carboxy-modifying agent for the introduction of at least one functional group species selected from the group consisting of hydroxyl, mercapto, amino, isocyanato and carbodiimido groups.

6. The dispersion according to claim 4, wherein the resin (a1) is a polyolefin modified with an unsaturated dicarboxylic acid or the anhydride thereof.

7. The dispersion according to claim 4, wherein the resin (a1) has an acid value of 5 to 100 mg KOH/g.

8. A thermocrosslinkable resin dispersion which comprises
a continuous phase comprising an aqueous medium and a dispersed phase distributed therein;
said dispersed phase comprising particles (I) of a resin component and particles (II) of a crosslinking agent as separately dispersed from the particles (I),
said resin component comprising, as an essential constituent thereof, a polyolefin resin (a) or a mixture thereof with a vinyl resin (b),
said resin (a) having a number average molecular weight of at least 1,500 and being comprised of a polyolefin polymer (a0) having been modified by the addition of at least one functional group species selected from the group consisting of carboxyl, hydroxyl, mercapto, amino, isocyanato and carbodiimido groups,
said resin (b) having a number average molecular weight of 700 to 40,000 and a glass transition temperature of −65 to 40° C., and
said crosslinking agent having at least two groups reactive with said resin (a);
wherein the crosslinking agent has at least two reactive groups selected from the group consisting of hydroxyl, amino, epoxy and carbodiimido groups;
wherein the resin (a) is a polyolefin resin modification (a2) comprising said carboxy-modified polyolefin resin (a1) having been further reacted with one or more modifying agents other than a carboxy-modifying agent for the introduction of at least one functional group species selected from the group consisting of hydroxyl, mercapto, amino, isocyanato and carbodiimido groups;
wherein the resin (a2) comprises at least one modified polyolefin resin selected from the group consisting of hydroxyl-modified polyolefin resins, mercapto-modified polyolefin resins, amino-modified polyolefin resins, isocyanato-modified polyolefin resins and carbodiimido-modified polyolefin resins.

9. The dispersion according to claim 5, wherein the resin (a1) or (a2) comprises at least one polymer moiety with a number average molecular weight of at least 300.

10. A thermocrosslinkable resin dispersion which comprises
a continuous phase comprising an aqueous medium and a dispersed phase distributed therein;
said dispersed phase comprising particles (I) of a resin component and particles (II) of a crosslinking agent as separately dispersed from the particles (I),
said resin component comprising, as an essential constituent thereof, a polyolefin resin (a) or a mixture thereof with a vinyl resin (b),
said resin (a) having a number average molecular weight of at least 1,500 and being comprised of a polyolefin polymer (a0) having been modified by the addition of at least one functional group species selected from the group consisting of carboxyl, hydroxyl, mercapto, amino, isocyanato and carbodiimido groups,
said resin (b) having a number average molecular weight of 700 to 40,000 and a glass transition temperature of −65 to 40° C., and
said crosslinking agent having at least two groups reactive with said resin (a);
wherein the crosslinking agent has at least two reactive groups selected from the group consisting of hydroxyl, amino, epoxy and carbodiimido groups;
wherein the resin (a) is a polyolefin resin modification (a2) comprising said carboxy-modified polyolefin resin (a1) having been further reacted with one or more modifying agents other than a carboxy-modifying agent for the introduction of at least one functional group species selected from the group consisting of hydroxyl, mercapto, amino, isocyanato and carbodiimido groups;
wherein the resin (a1) or (a2) comprises at least one polymer moiety with a number average molecular weight of at least 300; and
wherein the polymer comprises at least one species selected from the group consisting of polyethers, polyesters, polyamides and polyurethanes.

11. The dispersion according to claim 9, wherein said polymer has at least one carboxy-reactive group selected from the group consisting of hydroxyl, mercapto, amino, isocyanato and carbodiimido groups.

12. The dispersion according to claim 9, wherein said polymer has a HLB value of at least 6.

13. The dispersion according to claim 1, wherein said resin component is a mixture of the resins (a) and (b).

14. The dispersion according to claim 13, wherein said mixture contains 1 to 50% by weight of the resin (b).

15. The dispersion according to claim 13, wherein the resin (b) is a polymer derived from at least one ethylenically unsaturated monomer selected from the group consisting of unsaturated hydrocarbons, alkyl (meth)acrylates, carboxyl group-containing unsaturated monomers and salts thereof.

16. The dispersion according to claim 1, wherein said resin component has a melting point or thermosoftening point of −45 to 120 ° C.

17. The dispersion according to claim 1, which further comprises 1 to 50% by weight, based on the weight of the resin (a), of an organic solvent.

18. The dispersion according to claim 17, wherein said solvent comprises one or more solvents selected from the group consisting of hydrocarbons, alcohols, ethers, ketones, esters and amides.

19. The dispersion according to claim 1, which further comprises at least one additive selected from the group consisting of colorants, dispersants, catalysts, fillers, flattening agents, flame retardants, antioxidants, ultraviolet absorbers and hydrolysis inhibitors.

20. The dispersion according to claim 1, wherein said particles (I) and (II) are contained therein in a weight ratio of 99/1 to 50/50 and at a total concentration of 5 to 60% based on the weight of the dispersion.

21. The dispersion according to claim 1, which comprises, as essential constituents, an aqueous resin component dispersion (A) comprising said resin (a) or a mixture thereof with said resin (b), if necessary together with an organic solvent, and an aqueous dispersion (B) of said crosslinking agent.

22. A method of coating which comprises applying the dispersion according to claim 1 to polyolefin plastics products.

23. The method according to claim 22, wherein a topcoating composition is or an intermediate coating composition and a topcoating composition are further applied onto the surface of the coat film formed from said dispersion after drying or baking thereof or by the wet-on-wet technique.

24. The method according to claim 22, wherein said dispersion applied onto said products is heated to a temperature of 60 to 180° C. for crosslinking of said resin component with said crosslinking agent.

25. A coated polyolefin plastics product obtained by the method according to claim 22.

26. A method for improving coating property of polyolefin plastics products, comprising the step of applying a primer comprising the dispersion according to claim 1 to polyolefin plastics products.

* * * * *